(12) United States Patent  
Ishioka et al.

(10) Patent No.: US 11,325,602 B2
(45) Date of Patent: May 10, 2022

(54) VEHICLE CONTROL DEVICE

(71) Applicant: HONDA MOTOR CO., LTD., Tokyo (JP)

(72) Inventors: Atsushi Ishioka, Wako (JP); Kanta Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 16/727,163

(22) Filed: Dec. 26, 2019

(65) Prior Publication Data

US 2020/0207354 A1 Jul. 2, 2020

(30) Foreign Application Priority Data

Dec. 27, 2018 (JP) .............................. JP2018-243946

(51) Int. Cl.
*B60W 30/18* (2012.01)
*B60W 10/04* (2006.01)
*B60W 10/20* (2006.01)
*B60W 10/18* (2012.01)

(52) U.S. Cl.
CPC ...... *B60W 30/18163* (2013.01); *B60W 10/04* (2013.01); *B60W 10/18* (2013.01); *B60W 10/20* (2013.01); *B60W 2420/42* (2013.01); *B60W 2554/4042* (2020.02); *B60W 2555/60* (2020.02); *B60W 2710/18* (2013.01); *B60W 2710/20* (2013.01); *B60W 2720/106* (2013.01)

(58) Field of Classification Search
CPC ...... B60W 10/04; B60W 10/18; B60W 10/20; B60W 2420/42; B60W 2554/4042; B60W 2555/60; B60W 2710/18; B60W 2710/20; B60W 2720/106; B60W 30/18163
See application file for complete search history.

(56) References Cited

U.S. PATENT DOCUMENTS

| 11,077,854 | B2 * | 8/2021 | Um | B60W 30/10 |
| 11,084,490 | B2 * | 8/2021 | Kim | G08G 1/167 |
| 11,084,491 | B2 * | 8/2021 | Kim | B60W 50/085 |
| 2015/0100216 | A1 * | 4/2015 | Rayes | B60W 30/143 |
| | | | | 701/96 |
| 2017/0203764 | A1 * | 7/2017 | Fujiki | B60W 10/20 |
| 2018/0118215 | A1 * | 5/2018 | Kim | B60W 40/04 |
| 2018/0129206 | A1 | 5/2018 | Harada et al. | |
| 2018/0297639 | A1 * | 10/2018 | Fujii | G05D 1/0257 |
| 2018/0345960 | A1 * | 12/2018 | Fujii | B62D 15/0255 |

(Continued)

FOREIGN PATENT DOCUMENTS

| JP | 2017-124743 A | 7/2017 |
| JP | 2017-207812 A | 11/2017 |

(Continued)

OTHER PUBLICATIONS

Office Action dated Nov. 9, 2021 issued over the corresponding Japanese Patent Application No. 2018-243946 with the English translation thereof.

*Primary Examiner* — Babar Sarwar

(74) *Attorney, Agent, or Firm* — Carrier Blackman & Associates, P.C.; Joseph P. Carrier; William D. Blackman

(57) ABSTRACT

A lane change assist control unit refers to characteristics of a remaining distance with respect to a host vehicle speed, with a lane travel speed of a second lane (main line) adjacent to a first lane (merging lane) as a parameter, and determines whether to continue or cancel a lane change assist control.

7 Claims, 15 Drawing Sheets

(56) References Cited

U.S. PATENT DOCUMENTS

2018/0345964 A1\* 12/2018 Fujii ..................... B60W 50/14
2018/0346027 A1\* 12/2018 Fujii .................. B62D 15/0255
2019/0096258 A1\* 3/2019 Ide ....................... B62D 15/025
2021/0146953 A1\* 5/2021 Horita ............... B60W 50/0205

FOREIGN PATENT DOCUMENTS

| JP | 2018-062300 A | 4/2018 |
| JP | 2018-077565 A | 5/2018 |

\* cited by examiner

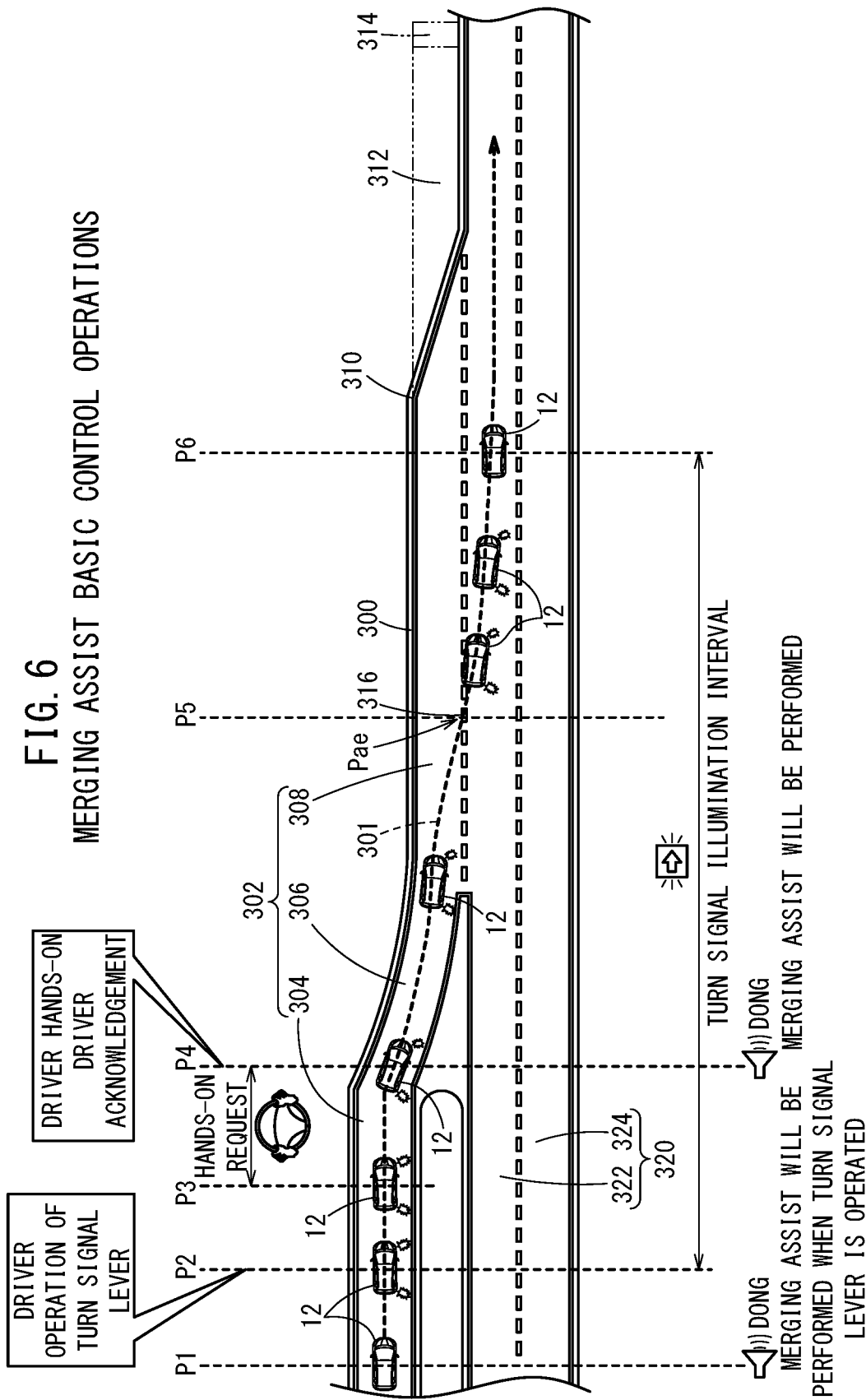

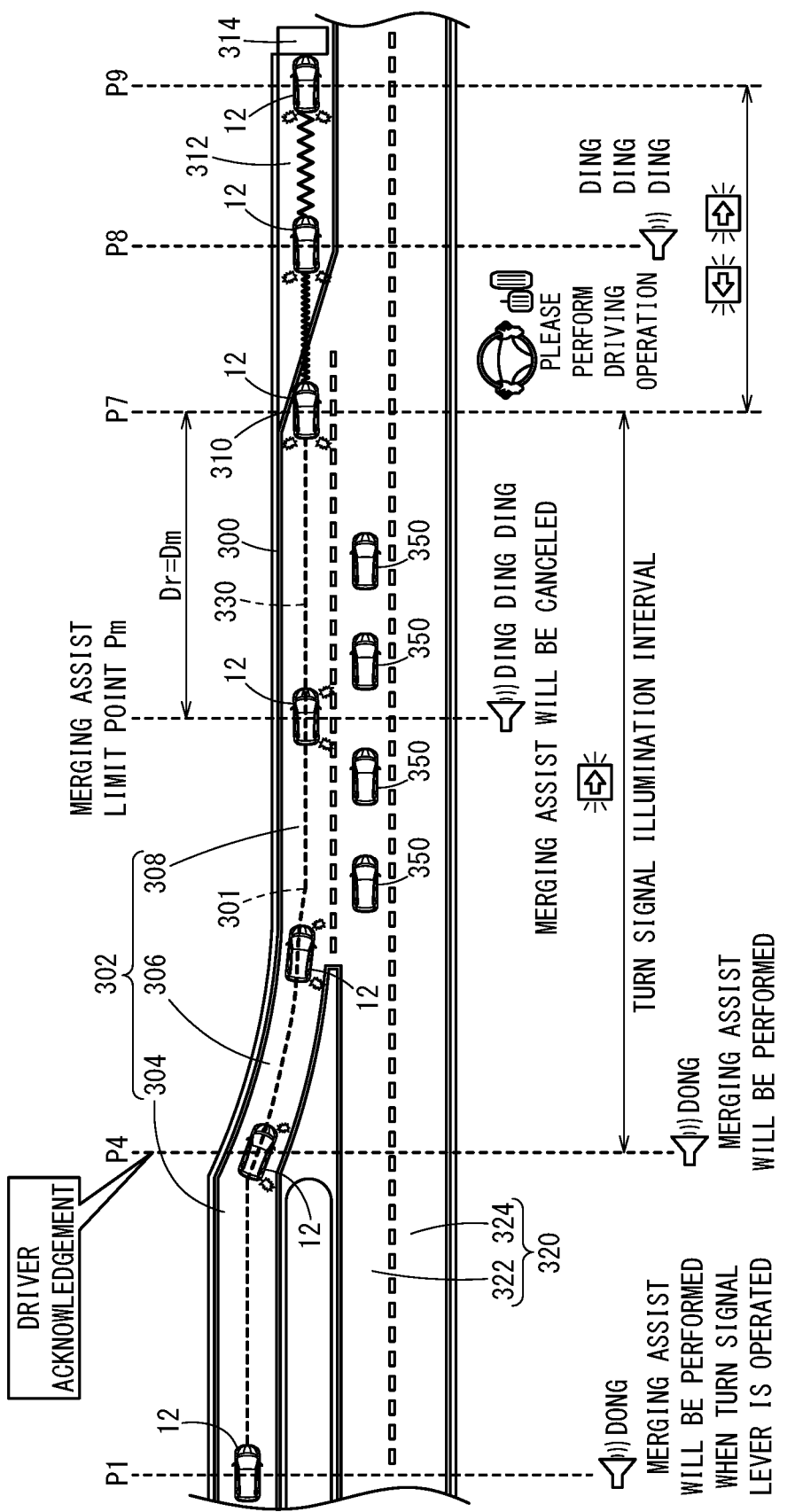

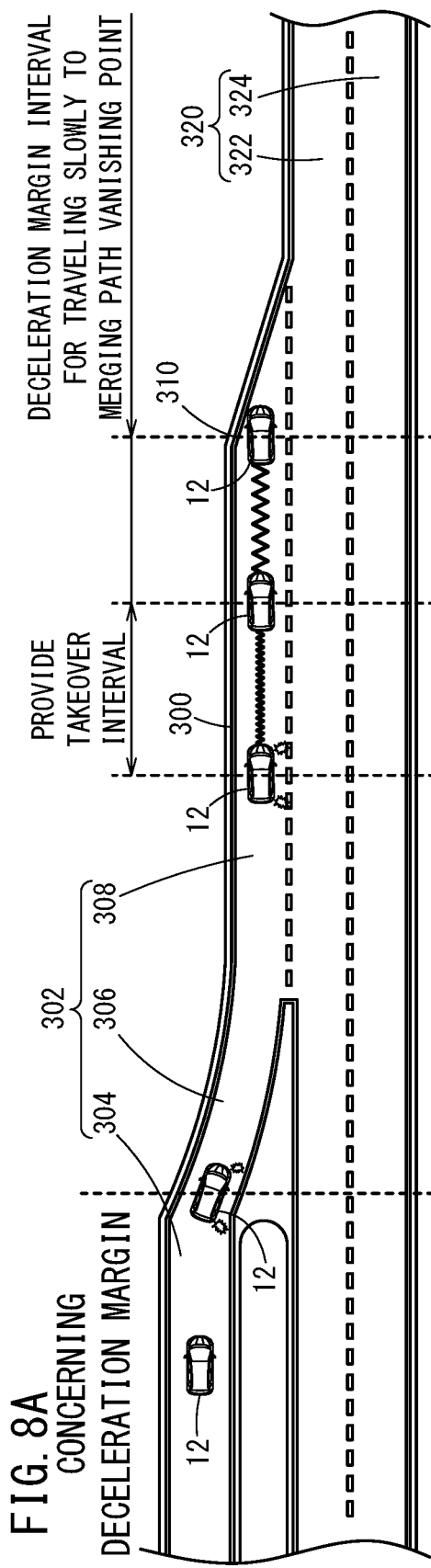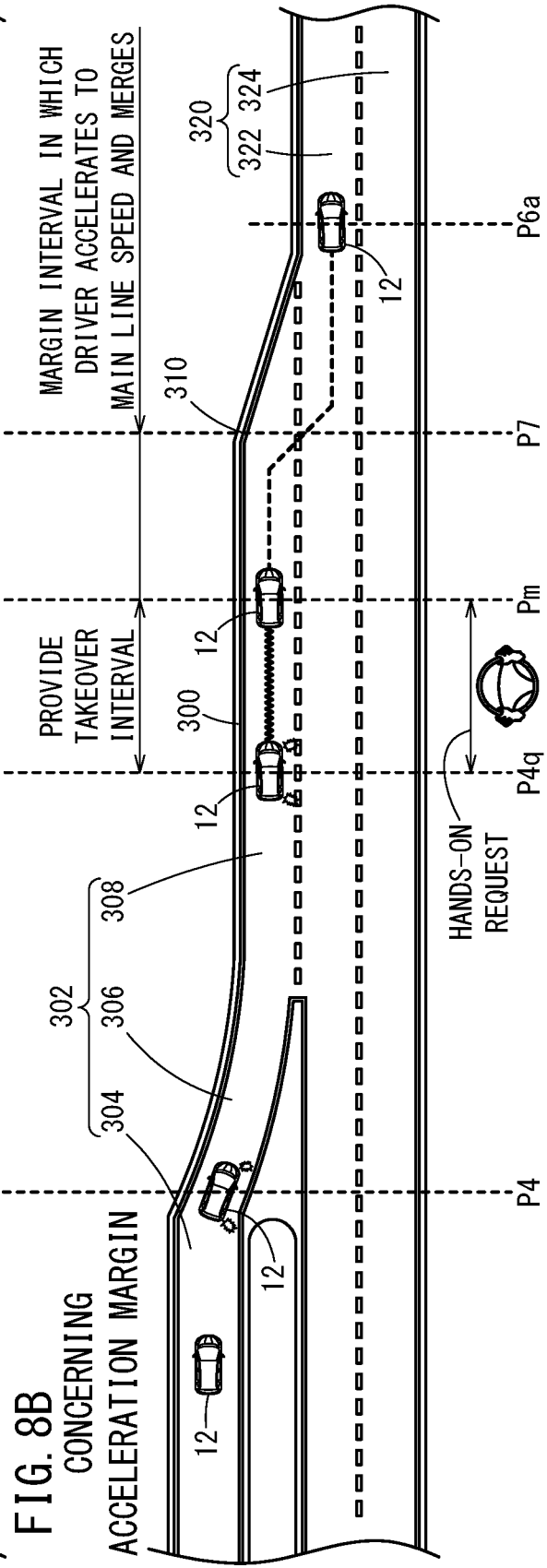

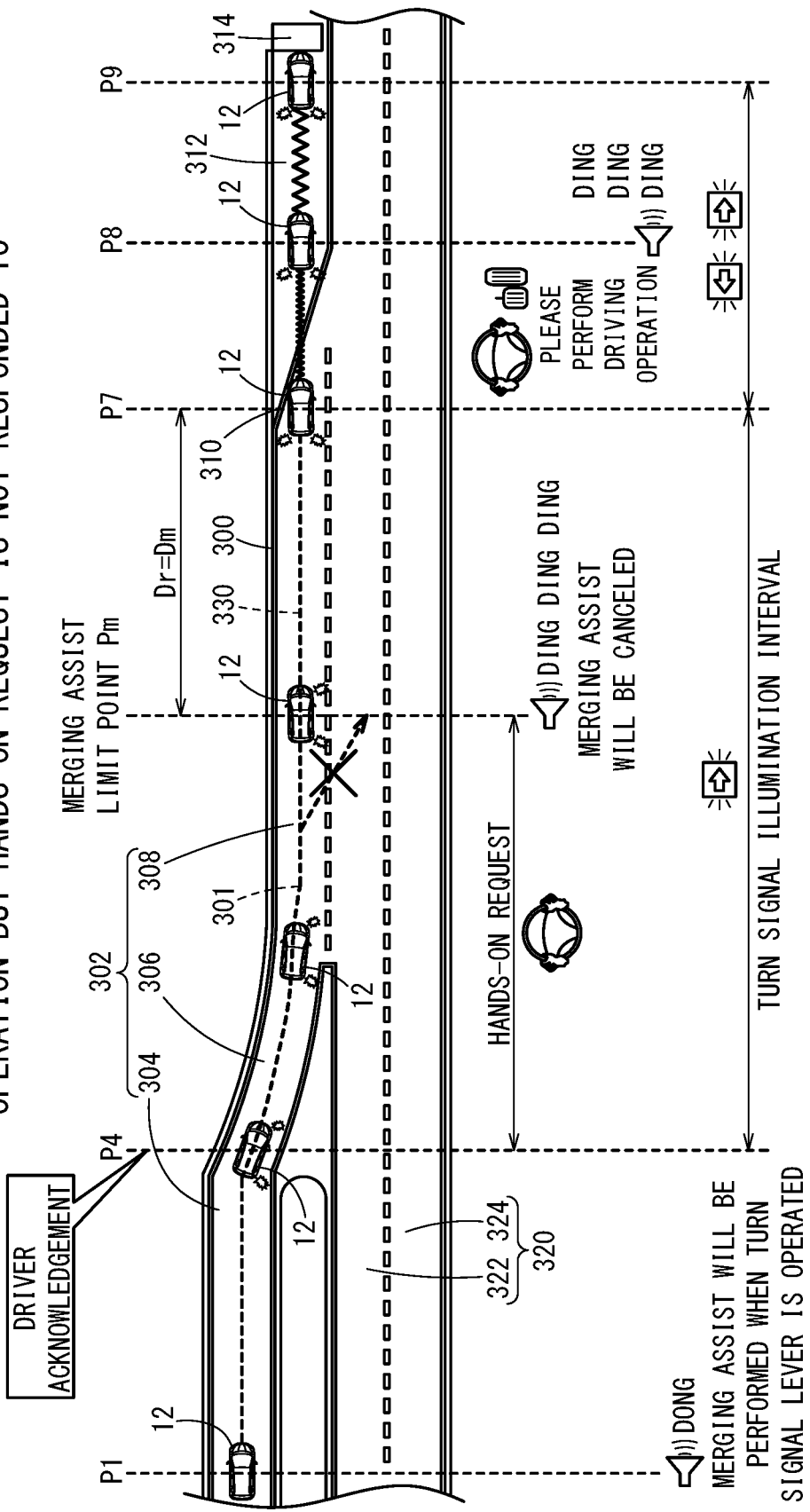

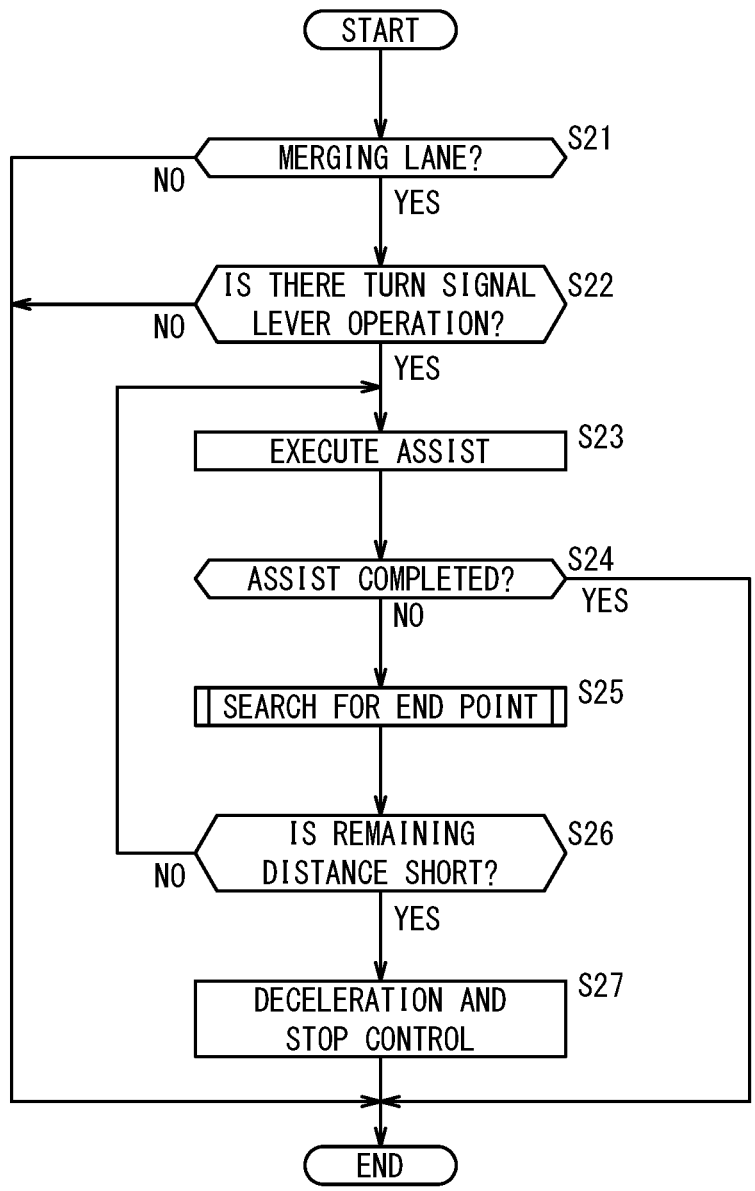

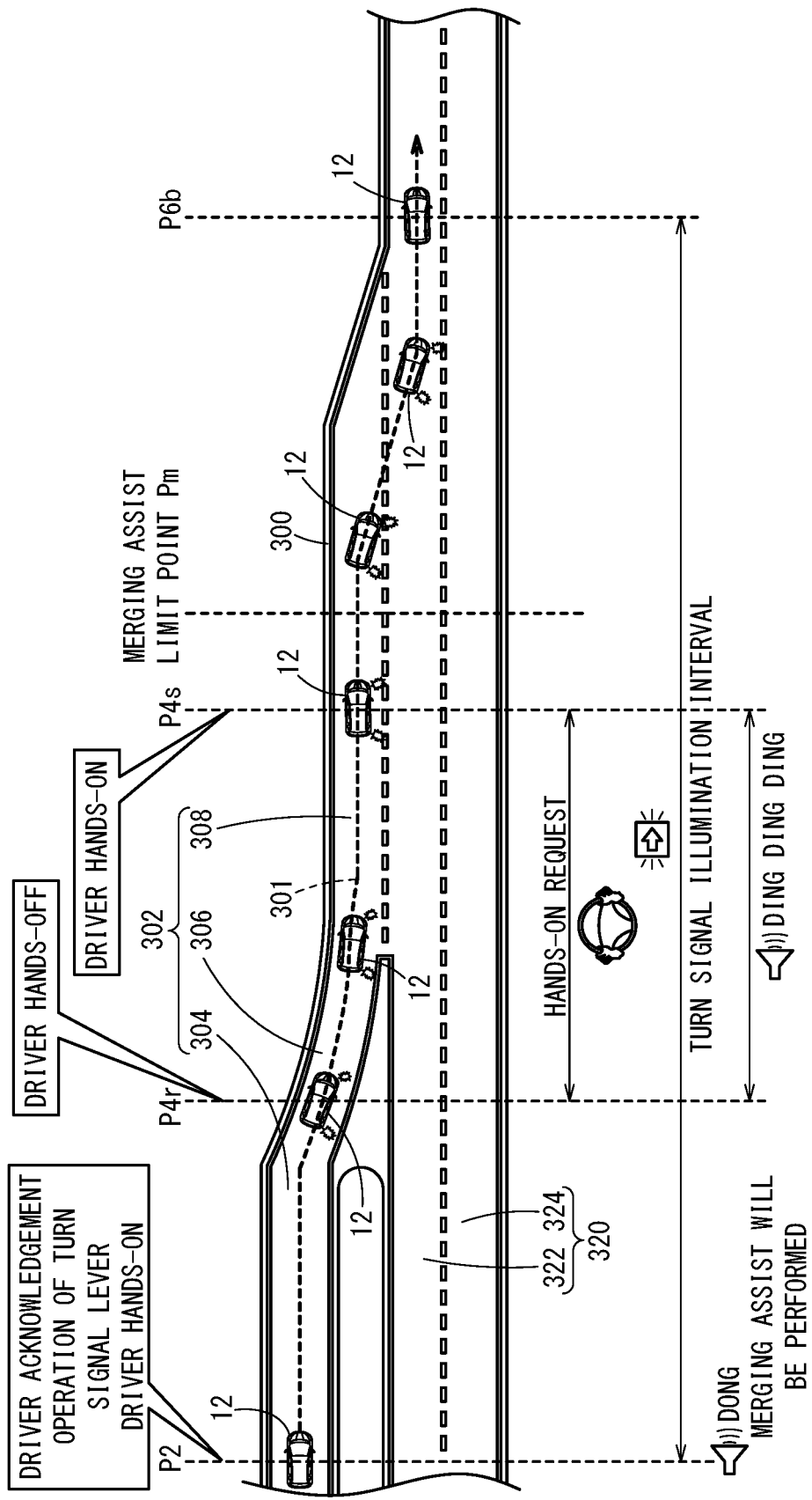

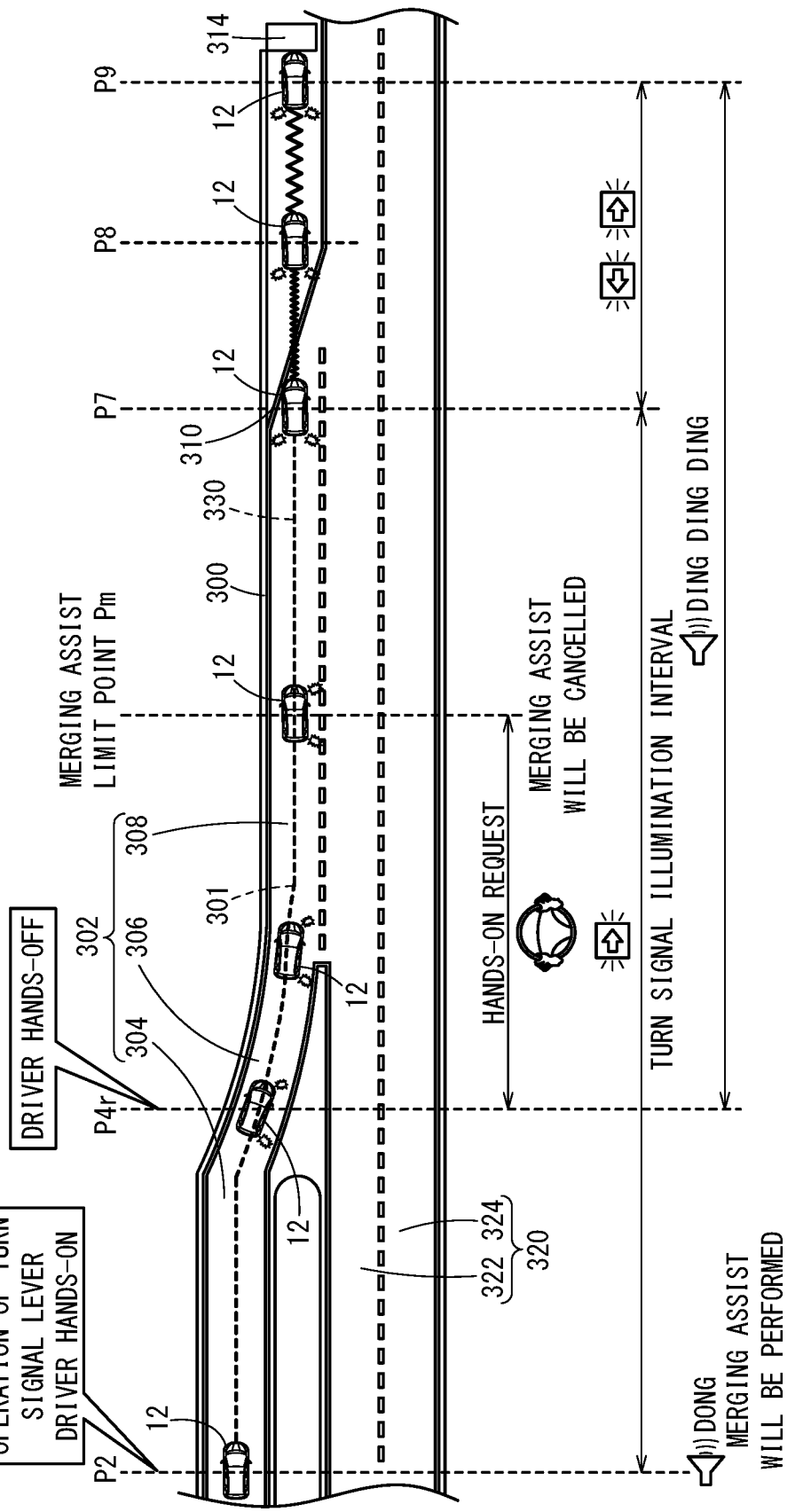

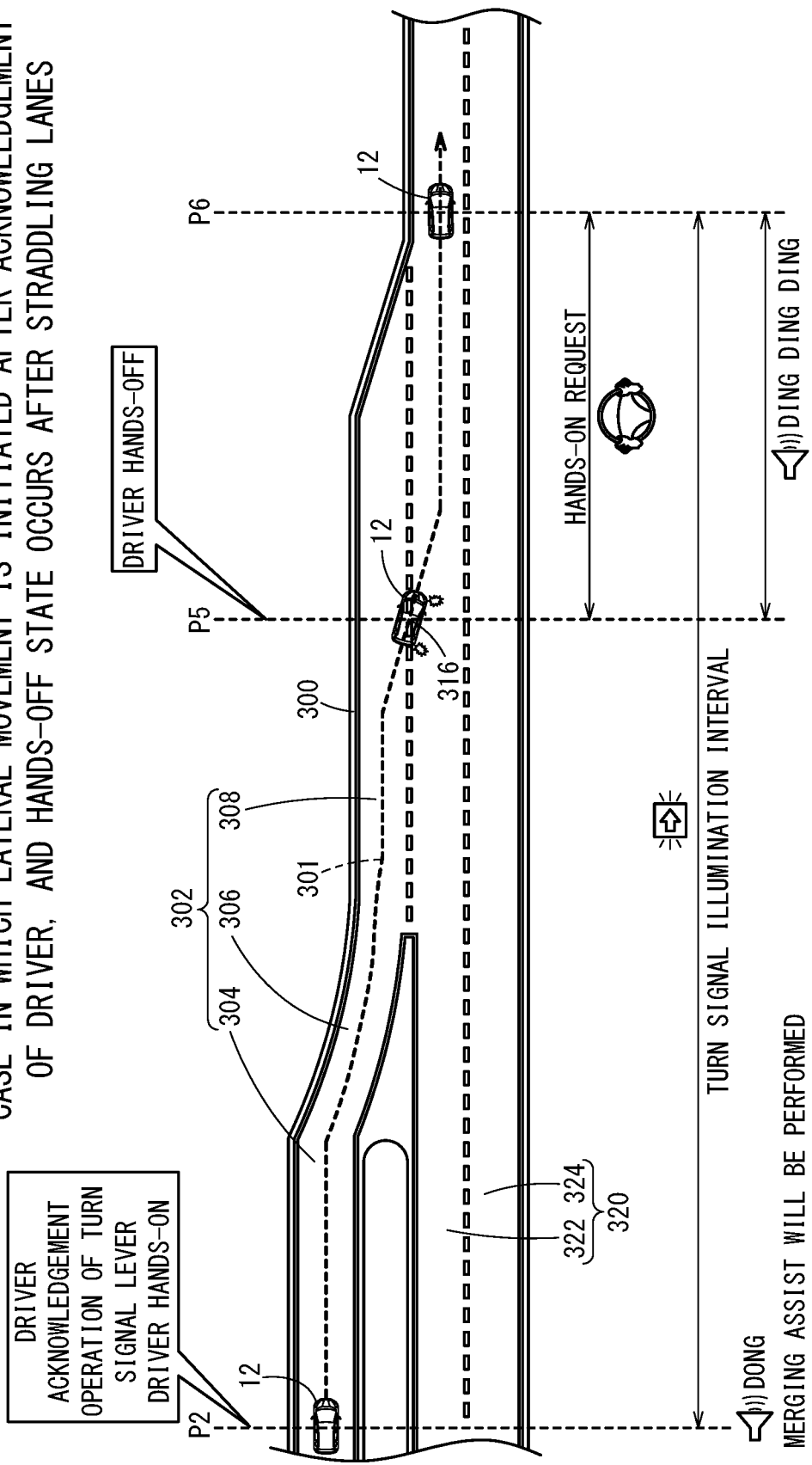

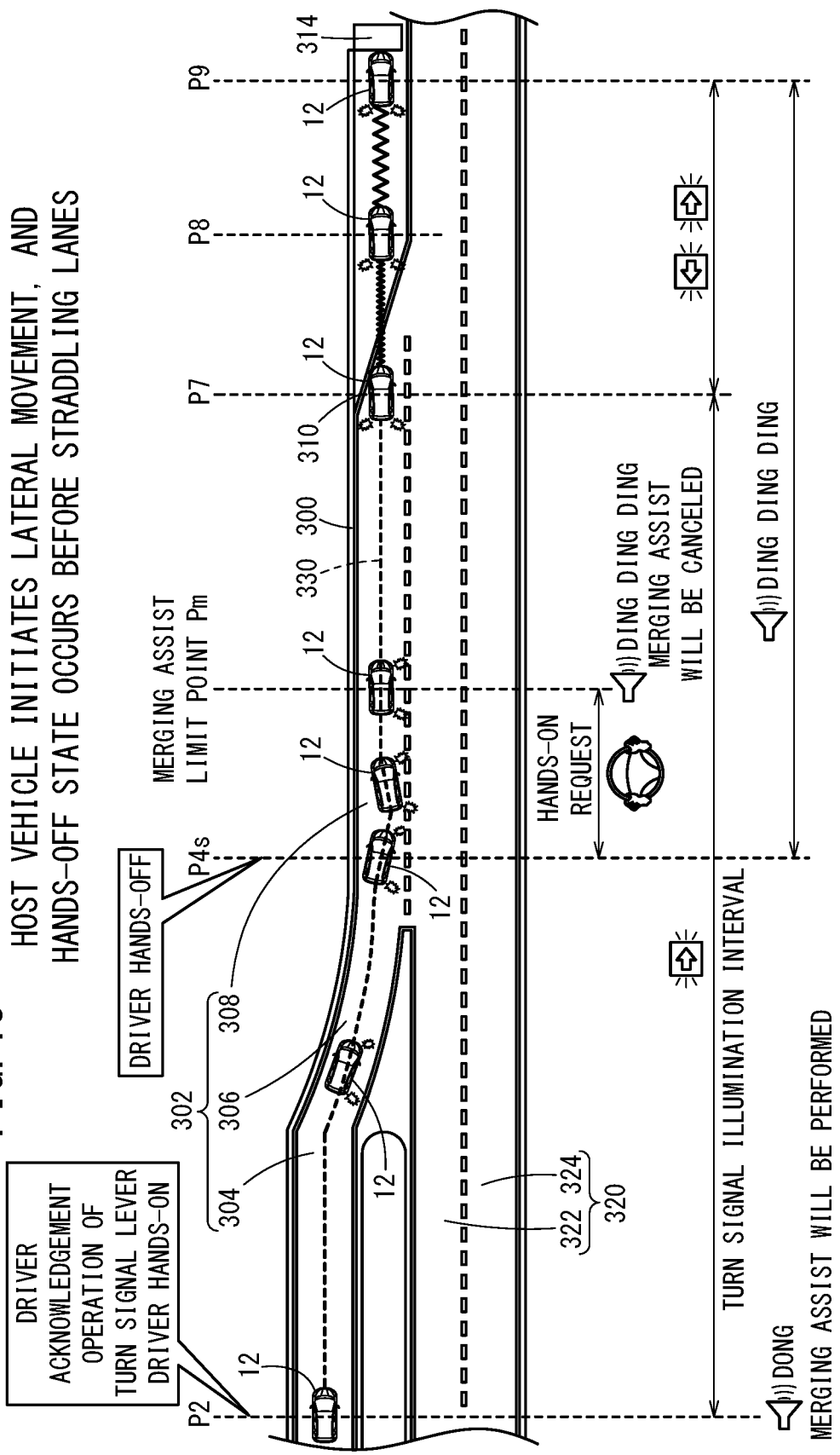

VEHICLE CONTROL DEVICE

CROSS-REFERENCE TO RELATED APPLICATION

This application is based upon and claims the benefit of priority from Japanese Patent Application No. 2018-243946 filed on Dec. 27, 2018, the contents of which are incorporated herein by reference.

BACKGROUND OF THE INVENTION

Field of the Invention

The present invention relates to a vehicle control device equipped with a lane change assist control unit that assists a host vehicle in making a lane change into an adjacent second lane when a first lane in which the host vehicle is currently traveling disappears.

Description of the Related Art

In the merging assist device disclosed, for example, in Japanese Laid-Open Patent Publication No. 2017-124743 (hereinafter referred to as JP2017-124743A), when a lane change assist control is performed from a merging lane into a lane to be merged with, a remaining distance from a host vehicle position to a merging end point is acquired (see paragraphs [0023] and [0047] of JP2017-124743A).

Further, a travel distance required until the vehicle comes to a stop when the vehicle is decelerated at a constant speed from the host vehicle position is obtained (see paragraph [0048] of JP2017-124743A).

Furthermore, the speed and position of other vehicles traveling in the lane to be merged with at that time is acquired (see paragraph [0053] of JP2017-124743A), on the condition that the remaining distance exceeds the travel distance required until the vehicle comes to a stop (see paragraph [0051] of JP2017-124743A).

In addition, assuming that the vehicle has made a lane change from the merging lane into the lane to be merged with, the lane change assist control is performed on the condition that no other vehicles exist with which a collision is possible (see paragraph [0053] of JP2017-124743A), and in the case that a collision with another vehicle is possible and the lane change assist is impossible, a step of acquiring the aforementioned remaining distance is returned to (see paragraph [0053] of JP2017-124743A).

Moreover, it is disclosed that, in the case that the remaining distance is less than the travel distance until the vehicle comes to a stop, the host vehicle is decelerated and the merging assist process is canceled (see paragraph [0054] of JP2017-124743A).

SUMMARY OF THE INVENTION

However, with the technique according to JP2017-124743A, the determination as to whether or not the lane change can be made depends on whether or not there is a possibility of a collision of the host vehicle with respect to another vehicle, and only corresponds to a lane change assist control under extremely narrow conditions.

The present invention has been devised taking into consideration such problems, and has the object of providing a vehicle control device which is capable of performing a lane change assist control to a maximum extent while the burden on the user is reduced.

One aspect of the present invention is characterized by a vehicle control device, comprising:
a lane change assist control unit configured to assist a lane change of a host vehicle into an adjacent second lane when a first lane in which the host vehicle is currently traveling disappears;
a remaining distance calculation unit configured to calculate a remaining distance until a vanishing point of the first lane; and
a second lane travel speed setting unit configured to set a lane travel speed of the second lane,
wherein the lane change assist control unit refers to the lane travel speed of the second lane, a host vehicle speed, and a characteristic including the remaining distance, and determines whether to continue or cancel the lane change assist control.

In accordance with the present invention, by referring to limit characteristics including the lane travel speed of the second lane which is the adjacent lane, the host vehicle speed, and the remaining distance, and determining whether to continue or cancel the lane change assist control, the lane change assist control unit is capable of easily performing the lane change assist control insofar as possible while the burden on the user who performs manual driving is reduced.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is an explanatory diagram of merging assist basic control operations;

FIG. 7 is an explanatory diagram of a case in which the merging assist cannot be performed due to the traffic environment;

FIG. 8A is an explanatory diagram of a deceleration margin interval;

FIG. 8B is an explanatory diagram of an acceleration margin interval;

FIG. 9 is an explanatory diagram of a case in which the merging assist cannot be performed after a driver acknowledgment operation;

FIG. 10 is a flowchart provided to describe operations of whether or not the merging assist can be implemented, whether or not deceleration and stopping is possible, and a deceleration vehicle stop position;

FIG. 12 is an explanatory diagram of a case in which, after acknowledgment of the driver, a hands-off operation and further a hands-on operation are performed;

FIG. 13 is an explanatory diagram of a case in which, after acknowledgment of the driver, the hands-off operation is continued until reaching a limit point of the merging assist;

FIG. 14 is an explanatory diagram of a case in which, after acknowledgment of the driver, the host vehicle initiates lateral movement, and then after straddling the lanes, the hands-off operation is performed; and FIG. 15 is an explanatory diagram of a case in which, after acknowledgment of the driver, the host vehicle initiates lateral movement, and prior to straddling the lanes, the hands-off operation is performed.

DESCRIPTION OF THE PREFERRED EMBODIMENTS

Preferred embodiments of a vehicle control device according to the present invention will be presented and described in detail below with reference to the accompanying drawings.

[Configuration]

Figure 1:
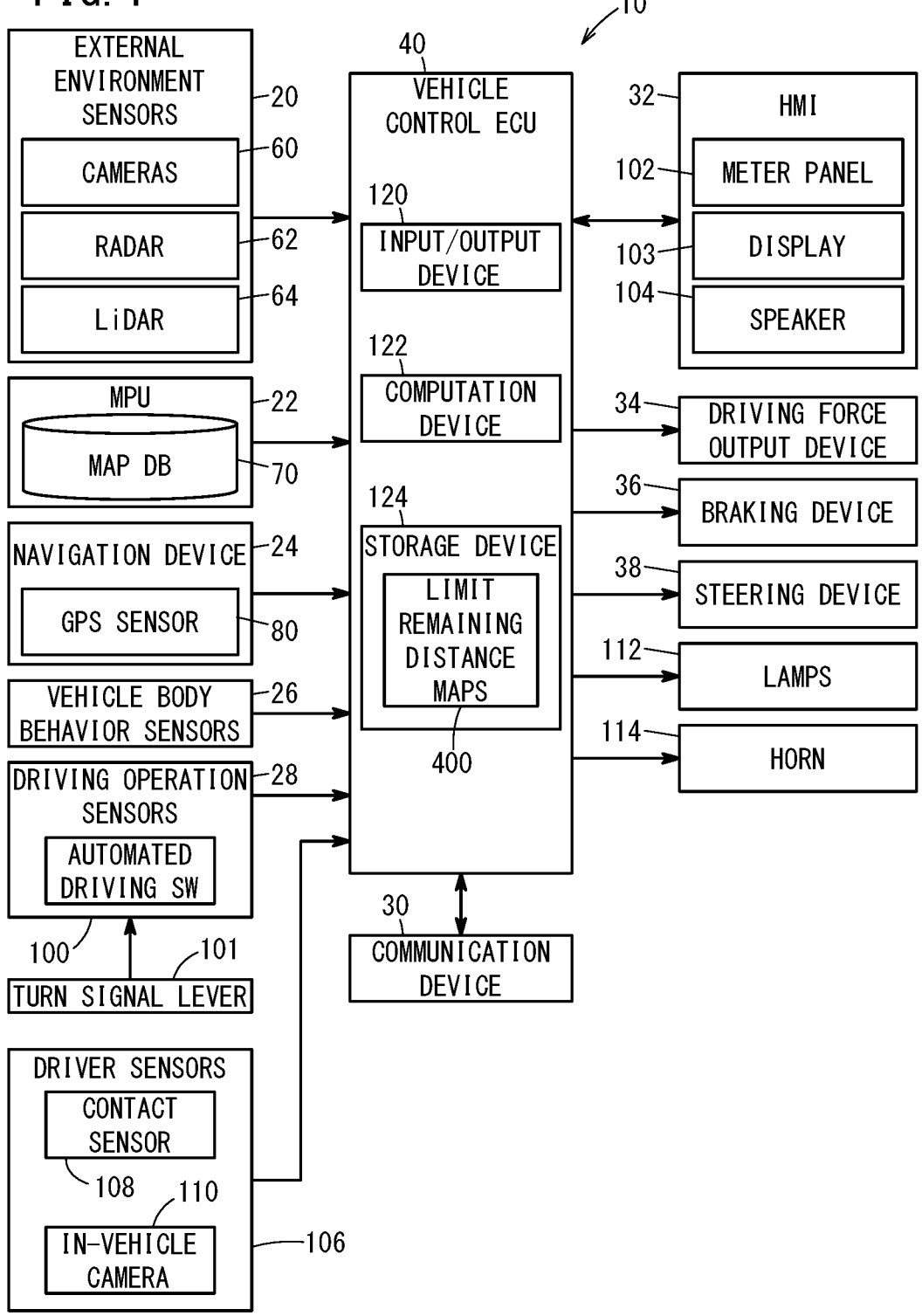
FIG. 1 is a schematic configuration block diagram of a vehicle including a vehicle control device according to a present embodiment.

FIG. 1 is a schematic configuration block diagram of a vehicle (also referred to as a "host vehicle" or a "driver's own vehicle") 12 equipped with a vehicle control device 10 according to a present embodiment.

The vehicle 12 is constituted from a vehicle control device 10, a driving force output device 34 controlled by the vehicle control device 10, a braking device 36, a steering device 38, lamps 112, and a horn 114. The lamps 112 include the head lamps, turn signal lamps, hazard lamps, and the like.

The vehicle control device 10 basically includes external environment sensors 20, a map positioning unit (MPU) 22, a navigation device 24, vehicle body behavior sensors 26, driving operation sensors 28, driver sensors 106, a communication device 30, a human machine interface (HMI) 32, and a vehicle control ECU 40 also functioning as an automated driving control unit.

The external environment sensors (external environment detection devices) 20 detect information concerning the external environment of the vehicle 12. The external environment sensors 20 include a plurality of cameras 60, a plurality of radar devices 62, and a plurality of LiDAR devices 64.

The plurality of cameras 60 output image information in relation to peripheral images captured of the periphery (front, sides, and rear) of the vehicle 12. The plurality of radar devices 62 output radar information indicative of reflected waves with respect to electromagnetic waves transmitted around the periphery (front, sides, and rear) of the vehicle 12. The plurality of LIDAR devices 64 continuously irradiate laser light in all directions of the vehicle 12, measure the three-dimensional positions of reflection points based on the reflected waves, and output such measurements as three-dimensional information.

The MPU 22 manages a map database (map) 70. Map information, which is of higher accuracy than the map information from the map database provided in the navigation device 24, is stored in the map 70. The MPU 22 provides the map information in response to a request from the navigation device 24 or the vehicle control ECU 40.

The navigation device 24 includes a satellite positioning system sensor, which in this instance is a GPS sensor 80. The GPS sensor 80 detects the current position of the vehicle 12. The navigation device 24 calculates a target route from the current position to a destination, and provides guidance to the vehicle occupant. When calculating the target route, the navigation device 24 acquires and utilizes the map information from the map database that is included within the navigation device 24 itself. The destination is input via a microphone or a display (display device) 103 which also functions as a touch panel.

The vehicle body behavior sensors 26 detect information (vehicle body behavior information) in relation to the behavior of the vehicle 12 (vehicle body). The vehicle body behavior sensors 26 include a vehicle speed sensor, an acceleration sensor, and a yaw rate sensor. The vehicle speed sensor detects the vehicle speed (current vehicle speed) Vj [km/h] and the forward direction of travel of the vehicle 12. The acceleration sensor detects the acceleration G [m/s2] of the vehicle 12. The acceleration G includes a longitudinal acceleration, a lateral acceleration, and a vertical acceleration. The yaw rate sensor detects the yaw rate Y [rad/s] of the vehicle 12.

The driving operation sensors 28 include an automated driving switch (automated driving SW) 100, and detects information (driving operation information) in relation to driving operations made by the driver. The driving operation sensors 28 also include an accelerator pedal sensor, a brake pedal sensor, a turn signal switch, a horn switch, and a hazard switch. The accelerator pedal sensor detects an operated amount [%] of the accelerator pedal. The brake pedal sensor detects an operated amount [%] of the brake pedal. The driving operation sensors 28 further include a steering angle sensor, a steering torque sensor, and the like. The turn signal switch detects operations of a turn signal lever 101. The automated driving SW 100 is a switch for issuing instructions by operations of the vehicle occupant to both initiate and terminate the automated driving control. In addition to or in place of the automated driving SW 100, it is also possible to instruct the initiation or termination of the automated driving control by other methods (such as voice input via a microphone).

The driver sensors (vehicle occupant sensors) 106 include a contact sensor (contact/pressure sensor) 108 made up from a capacitance sensor and/or a pressure sensor that detects (monitors) contact, gripping, or a pressure of the user (a vehicle occupant including the driver) applied to the steering wheel, and an in-vehicle camera 110 that monitors the vehicle occupant including the driver.

The communication device 30 performs wireless communications with external devices.

The HMI 32 accepts operations input from a vehicle occupant, together with presenting various information to the vehicle occupant visually, audibly, and tactilely. The HMI 32 includes a meter panel 102, the display 103, and a speaker 104.

The driving force output device 34 includes a travel drive source (an engine, a traction motor, etc.), and a drive electronic control device (drive ECU), neither of which are shown. The drive ECU adjusts the travel driving force of the vehicle 12 by controlling the travel drive source, based on an amount by which the accelerator pedal is operated, or a command from the vehicle control ECU 40.

The braking device 36 includes a brake motor and/or a hydraulic mechanism, a brake member, and a brake electronic control device (brake ECU). The braking device 36 may also serve to control engine braking by the engine and/or regenerative braking by the traction motor. The brake ECU controls the braking force of the vehicle 12 by causing a brake motor or the like to be operated, based on an amount by which the brake pedal is operated, or a command from the vehicle control ECU 40.

The steering device 38 includes an electric power steering (EPS) motor and an EPS electronic control unit (hereinafter referred to as an "EPS ECU"). The EPS ECU controls the steering angle of the vehicle 12 by controlling the EPS motor in accordance with operations of the steering wheel made by the driver or commands from the vehicle control ECU 40.

The vehicle control ECU 40 executes the automated driving control for driving the vehicle 12 to a destination without requiring driving operations (acceleration, deceleration, and steering) made by the driver, and includes a central processing unit (CPU). The vehicle control ECU 40 includes an input/output device 120, a computation device 122, and a storage device 124.

The input/output device 120 carries out input and output of information to and from devices (the sensors 20, 26, 28, and 106, etc.) other than the vehicle control ECU 40. The computation device 122 performs calculations on the basis of signals from the sensors 20, 26, 28, and 106, the communication device 30, the HMI 32, and the like. In addition, based on the results of such calculations, the computation device 122 generates and outputs signals with respect to the communication device 30, the HMI 32, the driving force output device 34, the braking device 36, and the steering device 38.

The storage device 124 stores programs and data used by the computation device 122. The storage device 124 includes RAMs (nonvolatile and volatile) and a ROM. Limit remaining distance maps (limit remaining distance characteristics) 400 are stored in the storage device 124.

Figure 2:
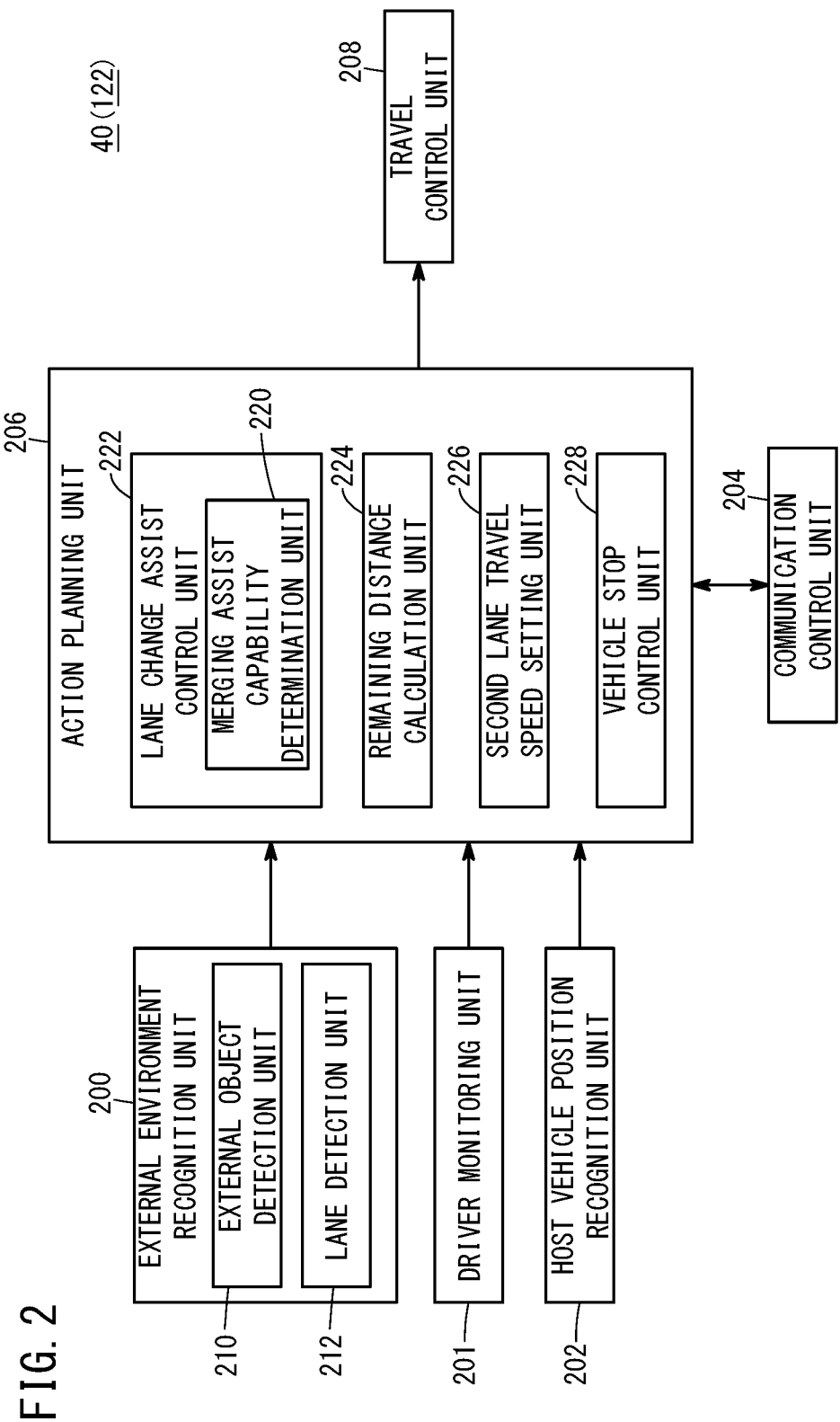
FIG. 2 is a block diagram showing constituent components of a computation device of a vehicle control ECU shown in FIG. 1.

FIG. 2 is a block diagram showing constituent components of the computation device 122 of the vehicle control ECU 40.

The computation device 122 of the vehicle control ECU 40 includes an external environment recognition unit 200, a driver monitoring unit 201, a host vehicle position recognition unit 202, a communication control unit 204, an action planning unit 206, and a travel control unit 208. Each of such respective units are realized by the computation device 122 (CPU, etc.) executing programs stored in the storage device 124 of the vehicle control ECU 40. Portions of the programs can also be constituted in the form of hardware.

On the basis of environmental information output from the external environment sensors 20, the external environment recognition unit 200 recognizes the circumstances and objects in the vicinity around the host vehicle 12. More specifically, the external environment recognition unit 200 includes an external object detection unit 210 and a lane detection unit 212. Based on the image information from the cameras 60, the road environment as a whole, for example, in addition to the road shape, the road width, positions of lane markings, the number of lanes, the lane width, traffic signs, guidance signs, and the illuminated state of traffic signals and the like, the flow of traffic such as the situation of other vehicles traveling in a merging lane (first lane) and a main lane (an adjacent second lane), a point (vanishing point) at which the merging lane disappears, and the presence or absence of free space in front of the point (merging lane vanishing point) at which the merging lane disappears are recognized.

The driver monitoring unit 201 monitors whether the driver is gripping (hands-on) or is not gripping (hands-off) the steering wheel on the basis of the output information from the capacitance detection type contact sensor 108, together with monitoring, on the basis of the output information from the in-vehicle camera 110, whether the driver is monitoring (eyes-on) or is not monitoring (eyes-off) the periphery of the vehicle, from the direction of the driver's face, the driver's line of sight, or the like.

The host vehicle position recognition unit 202 accurately recognizes the current position of the host vehicle 12 on the map 70 (local map) on the basis of the recognition results of the external environment recognition unit 200, the map information from the MPU 22, and the current position from the navigation device 24. The communication control unit 204 controls communications between the vehicle control ECU 40 and devices external to the vehicle.

The action planning unit 206 calculates a target trajectory of the host vehicle 12 to the destination that was input via the HMI 32. In addition, the action planning unit 206 determines a travel state of the host vehicle 12 based on the recognition results of the external environment recognition unit 200 and the host vehicle position recognition unit 202, as well as the detection results of the vehicle body behavior sensors 26, and by updating the target trajectory, formulates various actions for the host vehicle 12.

The target route calculated by the navigation device 24 serves to transmit the road to be traveled with respect to the driver, and merely serves as relatively rough guidance information. In contrast thereto, the target trajectory calculated by the action planning unit 206 includes relatively fine content for controlling the acceleration, deceleration, and steering of the vehicle 12, in addition to the rough target route calculated by the navigation device 24.

Figure 3:
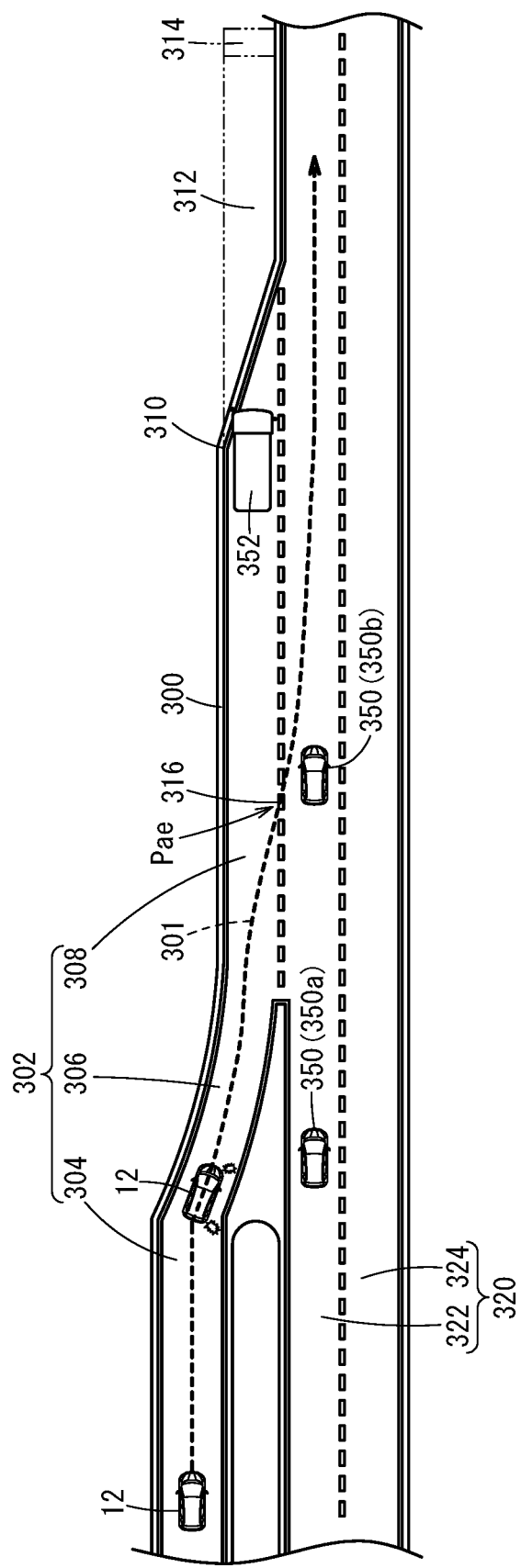
FIG. 3 is a plan view provided to describe operations that schematically illustrate a condition of a lane change assist control (merging assist control)

FIG. 3 is a plan view schematically showing a situation (in the vicinity of an expressway merging lane) provided to describe exemplary operations of the vehicle control device 10.

The host vehicle 12 travels along a target trajectory 301 indicated by the dashed line arrow, which is created by the action planning unit 206, and is attempting to pass through a merging point 316.

The expressway is indicative of a road in a country where it is decided that automobiles are to pass on the left side, and is composed of a merging lane (pre-merging lane) 302 and a main line 320, provided in this order from the side of an outer wall 300. It should be noted that the side of the opposing (oncoming) lane to the main line 320 is not illustrated.

The merging lane 302 is made up from an approach path 304, a rampway 306, and an acceleration lane 308, provided in this order from a front side in the direction of travel.

The merging lane 302 disappears at a vanishing point 310 (end point), and a free space 312 capable of being used as an emergency vehicle stop position outside of the road is provided in front of the vanishing point 310 in the direction of travel, and a car stop (vehicle barrier) 314 is provided at a vanishing point (end point) of the free space 312.

The main line 320 is made up from a merging destination lane (also referred to as a main line) 322, and a passing lane 324, provided in this order from the left side facing toward the direction of travel.

In FIG. 3, in order to facilitate understanding, the host vehicle 12 is shown to be the same vehicle drawn over the passage of time. However, other vehicles 350 (350a, 350b) in the main line 320, and an obstacle 352, which is another vehicle that is urgently stopped in the vicinity of the vanishing point 310, indicate different vehicles, respectively.

The external object detection unit 210 (see FIG. 2) detects external objects existing in the vicinity of the host vehicle 12. The external objects include the outer wall 300, the other vehicles 350 as surrounding vehicles, the obstacle 352, the car stop 314, and the like. Image information from the cameras 60 is used to detect the external objects. In addition to the image information from the cameras 60, radar information from the radar devices 62, and LiDAR information from the LiDAR devices 64 may be used. Alternatively, the other vehicles 350 may be detected by carrying out communications with the other vehicles 350 via the communication device 30. The cameras 60 may be stereo cameras which are capable of accurately detecting distance.

Using the image information of the cameras 60, the lane detection unit 212 detects the free space 312 in front of the merging lane 302, in addition to the merging lane 302 and the main line 320, which are lanes that exist around the periphery of the host vehicle 12. The merging lane 302, the main line 320, and the free space 312 may also be detected using the current position of the host vehicle 12 and the map information.

The action planning unit 206 includes a lane change assist control unit 222, which includes a merging assist capability determination unit 220, a remaining distance calculation unit 224, a second lane travel speed setting unit 226, and a vehicle stop control unit 228.

The merging assist capability determination unit 220 detects the position and speed of the host vehicle 12 that is traveling in the merging lane 302, and taking into consideration the surrounding conditions (flow of traffic, legal speed limit) in front of the host vehicle 12 and in the direction of the main line 320, determines whether or not the lane change assist control by the lane change assist control unit 222 from the merging lane 302 into the merging destination lane 322 of the main line 320 is possible.

The lane change assist control unit 222 assists the host vehicle 12 in making a lane change into the merging destination lane 322 as the adjacent second lane, at a time that the merging lane 302 as the first lane in which traveling is currently taking place disappears.

The second lane travel speed setting unit 226, which sets the lane travel speed Vm of the main line 320 as the second lane, in the case that the actual speed of the other vehicles 350 traveling in the merging destination lane 322 is detected, sets the detected actual speed as the second lane travel speed (merging lane travel speed) Vm, whereas in the case that the actual travel speed is not detected, sets the legal speed limit, which is acquired by searching the map 70 or the like, as the second lane travel speed Vm.

On the basis of the captured images captured by the cameras 60, the remaining distance calculation unit 224 calculates the remaining distance Dr from the position of the host vehicle to the vanishing point 310 of the merging lane 302. In the case that the captured images cannot be acquired, the remaining distance Dr is calculated using the map information. When calculating the remaining distance Dr to the vanishing point 310, in the case that the obstacle 352 such as another vehicle or the like is detected at the vanishing point 310, the remaining distance Dr is set to a shorter distance in consideration of the size of the obstacle 352.

The lane change assist control unit 222 determines whether or not the remaining distance Dr from the position of the host vehicle to the vanishing point 310 of the merging lane 302 is greater than or equal to a limit remaining distance Dm within which the lane change assist control is possible, and if the remaining distance Dr is greater than or equal to the limit remaining distance Dm (Dr≥Dm), the lane change assist control unit 222 determines that the lane change assist is possible, and supplies an action plan (trajectory, speed, acceleration/deceleration information) concerning the lane change assist control signals to the travel control unit 208.

If the remaining distance Dr is less than the limit remaining distance Dm, it is determined that the lane change assist control is impossible, and such a fact is supplied to the vehicle stop control unit 228.

In the case that merging is impossible, the vehicle stop control unit 228 supplies an action plan (target trajectory, speed, acceleration/deceleration information) to the travel control unit 208 concerning the vehicle stop control signals to cause the host vehicle 12 to stop at an appropriate vehicle stop position.

In the case that the free space 312 is present as a vehicle stop position outside of the road at a more frontward location than the vanishing point 310 of the merging lane 302, the vehicle stop control unit 228 supplies to the travel control unit 208 an action plan (target trajectory, speed, acceleration/deceleration information) concerning the stop control signals for causing the vehicle to stop within the free space 312, whereas in the case that the free space 312 does not exist, the vehicle stop control unit 228 supplies to the travel control unit 208 an action plan (target trajectory, speed, acceleration/deceleration information) concerning the stop control signals for causing the vehicle to stop within the merging lane 302, and more specifically, in the vicinity of the vanishing point 310 of the merging lane 302.

The travel control unit 208 calculates and transmits control commands with respect to the driving force output device 34, the braking device 36, and the steering device 38, on the basis of action plans (target trajectory, speed, acceleration/deceleration information) supplied from the action planning unit 206. Stated otherwise, the travel control unit 208 controls the outputs of each of respective actuators that control the vehicle body behavior. Among such actuators, there are included the engine, the brake motor, and the EPS motor. By controlling the outputs of the actuators, the travel control unit 208 controls behavior amounts of the vehicle 12 (in particular, the vehicle body). The vehicle body behavior amounts referred to in this instance include, for example, the vehicle speed, the longitudinal acceleration, the steering angle, the lateral acceleration, and the yaw rate.

[Detailed Operations]

A description will be given in the following order concerning lane change assist control operations (merging assist control operations) of the vehicle control device 10, which is constituted and operates basically in the manner described above.

A. A continuation or cancellation determination operation of the lane change assist control (merging assist control);

B. Basic control operations of the merging assist control;

C. Operations for a case in which the merging assist control is initiated but the assist is impossible due to the traffic environment or the like;

D. The concept of the merging assist limit point;

E. Operations for a case in which there is a driver acknowledgment operation, but the vehicle comes to a stop without responding to the hands-on request;

F. Operations for a case in which the vehicle is stopped outside of the road (in the free space) or within the road (at the vanishing point of the merging path);

G. Operations for a case in which a hands-off state occurs after acknowledgment of the driver, and a hands-on state occurs again before the limit point of the merging assist;

H. Operations for a case in which a hands-off state occurs after acknowledgment of the driver, and the hands-off state is continued until reaching the limit point of the merging assist;

I. Operations for a case in which, after acknowledgment of the driver, the host vehicle starts to move laterally and straddles the lanes, and thereafter a hands-off state occurs; and J. Operations for a case in which, after acknowledgment of the driver, the system initiates lateral movement, and before straddling the lanes, a hands-off state occurs.

A. Continuation or Cancellation Determination Operations of the Lane Change Assist Control (Merging Assist Control)

Continuation or cancellation determination operations of the lane change assist control (merging assist control) will be described with reference to the flowchart of FIG. 4.

Figure 4:
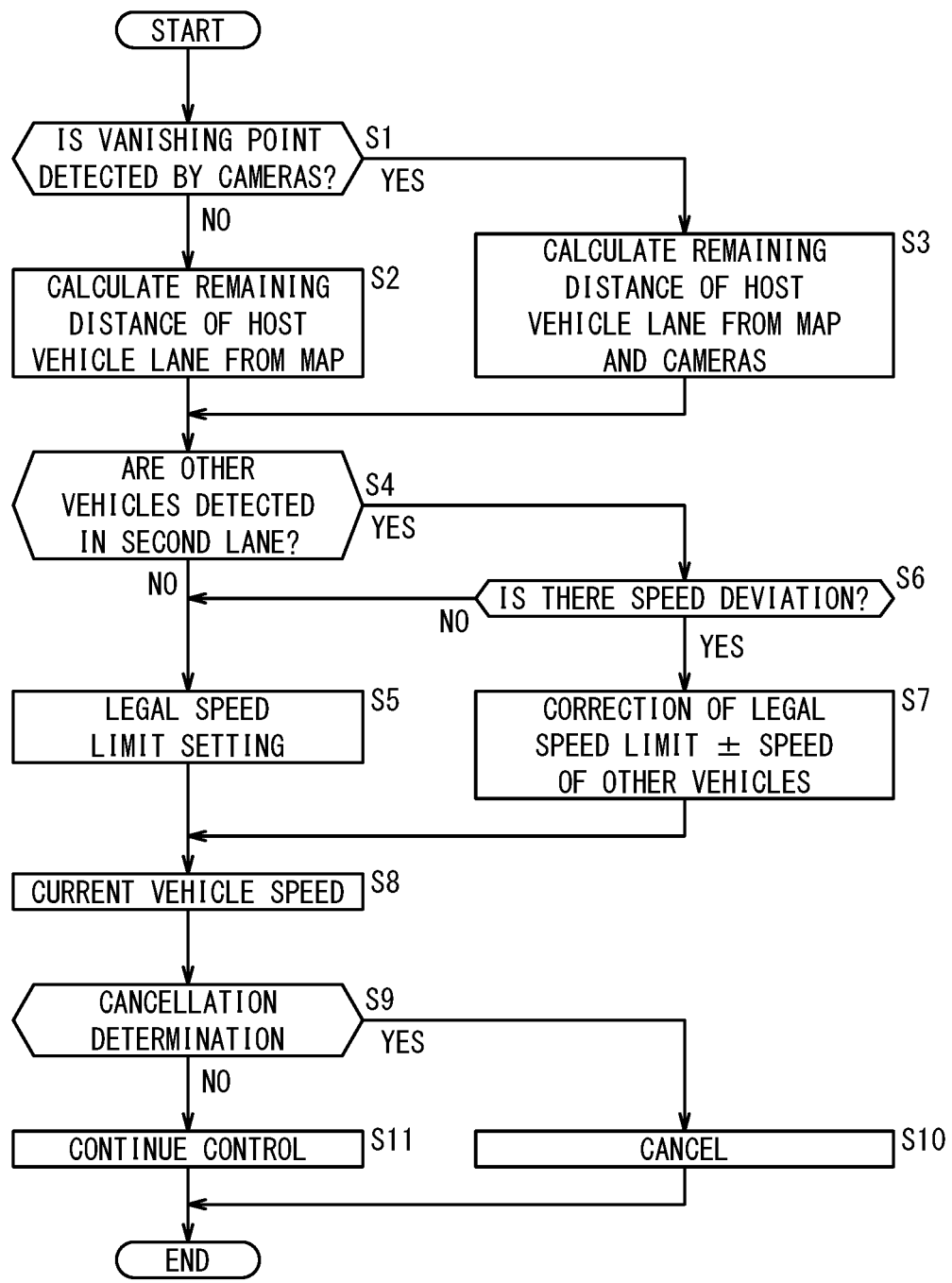
FIG. 4 is a flowchart provided to describe operations of the vehicle control device.

While the host vehicle 12 is traveling in the approach path 304 (see FIG. 3) of the merging lane 302, the steps shown in the flowchart of FIG. 4 are initiated. In step S1, the remaining distance calculation unit 224 detects, by way of the cameras 60 and through the external object detection unit 210 and the lane detection unit 212, the vanishing point of the merging lane 302, and more specifically, the vanishing point 310 (see FIG. 3) of the acceleration lane 308.

If the vanishing point 310 cannot be detected by the cameras 60 (step S1: NO), then in step S2, the remaining distance calculation unit 224, using the map DB 70 and the GPS sensor 80, calculates the remaining distance Dr of the first lane (host vehicle lane), or stated otherwise, the remaining distance Dr of the merging lane 302. The remaining distance Dr is indicative of the distance from the current position (current point) of the host vehicle 12 while traveling in the merging lane 302 to the vanishing point 310 of the acceleration lane 308.

In the case that the vicinity of the vanishing point 310 is detected by the cameras 60 (step S1: YES), and if the obstacle 352 such as a stopped other vehicle or the like (see FIG. 3) is detected in the vicinity of the vanishing point 310, then in step S3, the remaining distance Dr is calculated by correcting the remaining distance Dr, which is calculated using the map DB 70, by the length of the obstacle 352 such as the other vehicle or the like that is calculated based on the image information from the cameras 60. More specifically, in comparison with the remaining distance Dr when the obstacle 352 is not detected, the remaining distance Dr when the obstacle 352 is detected becomes shorter in length by the length of the obstacle 352 in the travel direction of the host vehicle 12. Moreover, in the case that the vicinity of the vanishing point 310 is detected by the cameras 60, and if the obstacle 352 is not detected, the remaining distance Dr is calculated using the map DB 70.

Next, in step S4, the lane change assist control unit 222 detects through the external object detection unit 210 whether or not the other vehicles 350 exist that are traveling in the second lane, or in other words the main line 320 adjacent to the pre-merging lane 302.

If the presence of the other vehicles 350 are not detected (step S4: NO), then in step S5, the second lane travel speed setting unit 226 refers to the map 70 and sets the travel speed of the second lane to the legal speed limit. Moreover, in the case that the lane speed displayed by way of a vehicle exterior indicator light or a sign or the like can be detected by the cameras 60, it is preferable to change the legal speed limit to the detected and displayed lane speed, and to set the displayed lane speed as the travel speed of the second lane.

On the other hand, if the presence of the other vehicles 350 is detected (step S4: YES), then in step S6, the speed of the other vehicles 350 is compared with the legal speed limit or the like (the legal speed limit or the detected and displayed lane speed), and in the case that a speed deviation (speed difference) therebetween is not greater than or equal to a predetermined speed (step S6: NO), then in step S5, the second lane travel speed Vm is set to the legal speed limit or the like.

On the other hand, in step S6, the speed of the other vehicles 350 is compared with the legal speed limit or the like, and in the case that the speed deviation (speed difference) is greater than or equal to the predetermined speed (step S6: YES), then in step S7, the second lane travel speed setting unit 226 sets the second lane travel speed Vm in consideration of the speed difference in the legal speed limit or the like (the legal speed limit is corrected by the speed of the other vehicles→increased in the case that the speed of the other vehicles is faster, decreased in the case of being slower).

Next, in step S8, the lane change assist control unit 222 acquires the current vehicle speed Vj of the host vehicle 12 through the vehicle body behavior sensors 26.

Next, in step S9, the lane change assist control unit 222 carries out a cancellation determination of determining whether or not to cancel (or continue) the lane change assist control.

Figure 5:
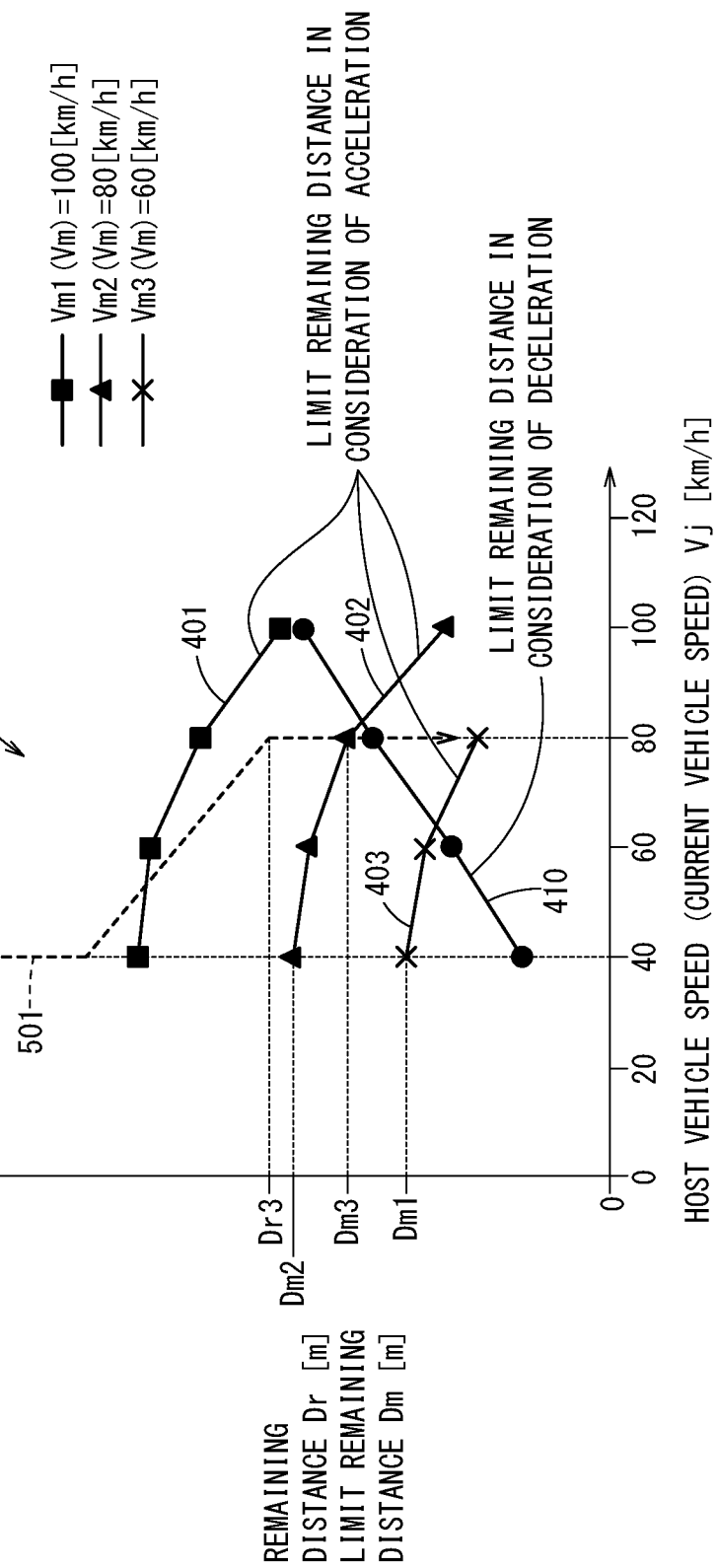
FIG. 5 is an explanatory diagram of a limit remaining distance map.

FIG. 5 shows limit remaining distance maps (limit remaining distance characteristics, limit characteristics) 400 in the form of characteristics (maps) that are used in the cancellation determination process.

The limit remaining distance maps 400 are maps showing a necessary and shortest distance (limit remaining distance Dm) within which the lane change assist control unit 222 is capable of realizing the lane change assist control, after the host vehicle 12 has accelerated in the acceleration lane 308 from the current vehicle speed Vj and reaches the second lane travel speed Vm, which is the set speed (the legal speed limit or the speed obtained by correcting the legal speed limit by the actual speed) of the merging destination lane (main line) 322.

More specifically, the limit remaining distance Dm is set to the necessary and shortest distance in consideration of a transition time period within which, until reaching the vanishing point 310, the merging (lane change) assist control can be performed by the vehicle 12 initiating lateral movement to the side of the main line 322 while maintaining the system upper limit acceleration of the vehicle 12, and by accelerating to the lane set speed Vm of the main line 322 until reaching a lane maintenance point Pae (merging point 316) (see FIG. 3) within the merging lane 302. Moreover, the position that becomes the limit remaining distance Dm is referred to as a limit point Pm.

In FIG. 5, the horizontal axis indicates the host vehicle speed (current vehicle speed) Vj [km/h], and the vertical axis indicates the remaining distance Dr [m] or the limit remaining distance Dm [m]. In addition, a map is provided in which the second lane set vehicle speed (set vehicle speed) Vm is used as a parameter.

A limit remaining distance map 401 connected by the square markings is a map in which the second lane travel speed Vm is Vm1=100 [km/h], a limit remaining distance map 402 connected by the triangle markings is a map in which the second lane travel speed Vm is Vm2=80 [km/h], and a map 403 connected by the x markings is a map in which the second lane travel speed Vm is Vm3=60 [km/h]. Maps that do not correspond to the illustrated second lane travel speed Vm can be calculated by an interpolation computation implemented by way of either interpolation or extrapolation.

When the host vehicle speed Vj is 40 [km/h], in the case that the lane change assist control is performed by accelerating to 60 [km/h], with reference to the limit remaining distance map 403, it can be understood that a remaining distance Dr [m] corresponding to the limit remaining distance Dm1 [m] is required. Further, when the host vehicle speed Vj is 40 [km/h], in the case that the lane change assist control is performed by accelerating to 80 [km/h], with reference to the limit remaining distance map 402, it can be understood that a remaining distance Dr [m] corresponding to the limit remaining distance Dm2 [m] is required.

Stated conversely, for example, in order to carry out the lane change assist control by accelerating the vehicle 12 having a host vehicle speed Vj=40 [km/h] to the set vehicle speed Vm2=80 [km/h], as shown in a speed profile 501 indicated by the dashed line arrow, when a remaining distance Dr3 in excess of the limit remaining distance Dm3 is reached at an acceleration end time at (or in the vicinity of) the system upper limit acceleration from the start of acceleration, it is determined that (continuation of) the lane change assist control is possible, whereas in the case that the remaining distance Dr less than the limit remaining distance Dm3 is reached, it is determined that (continuation of) the lane change assist control is impossible (the lane change assist control is abandoned).

Thus, in the cancellation determination of step S9, the merging assist capability determination unit 220 of the lane change assist control unit 222, by referring to the maps (characteristics) 400 of the remaining distance Dr with respect to the vehicle speed Vj while using the second lane travel speed (set vehicle speed) Vm as a parameter, is capable of determining whether to continue (step S9: NO) or cancel (step S9: YES) the lane change assist control based on the presence or absence of the limit remaining distance Dm.

If the determination is made not to cancel, then in step S11, the lane change assist control is continued, whereas if the determination is made to cancel, then in step S10, the lane change assist control is canceled.

Moreover, in the case that the determination is made to cancel, then with reference to a limit remaining distance map (limit remaining distance characteristic) 410 shown in FIG. 5, an appropriate stopping process (vehicle stopping process) such as a two-stage deceleration control or the like is performed. In this case, in the limit remaining distance map 410, the minimum distance necessary for the host vehicle 12 to be brought to a stop at the maximum system deceleration is shown.

Further, the limit remaining distance maps 401 to 403 in consideration of acceleration, and the limit remaining distance map 410 in consideration of deceleration may be offset-corrected in accordance with the condition (coefficient of friction) of the road surface and the type and remaining tread height of the tires.

Moreover, although the above-described cancellation determination is performed with reference to the limit remaining distance maps 401, 402, and 403 in consideration of acceleration, the present invention is not limited to this feature. For example, prior to the current host vehicle speed Vj of the host vehicle 12 during acceleration reaching the second lane travel speed Vm, which is defined in the limit remaining distance maps 401, 402, and 403 in consideration of acceleration, in the case of a situation in which the host vehicle 12 arrives at the limit remaining distance Dm in the limit remaining distance map 410 in consideration of deceleration, then when the limit remaining distance Dm in the limit remaining distance map 410 in consideration of deceleration is reached, the lane change assist control (in this case, the merging assist control) may be canceled, deceleration may be initiated, and the vehicle stopping process may be performed. More specifically, in the case that the control process is carried out in this manner, the cancellation control is performed with priority given to the limit remaining distance map 410 in consideration of deceleration over the limit remaining distance maps 401, 402, and 403 in consideration of acceleration.

The limit remaining distance maps 400 shown in FIG. 5 are characteristics of the remaining distance Dr (limit remaining distance Dm) with respect to the current host vehicle speed Vj, with the lane travel speed Vm of the main line 320 as a parameter. However, the present invention is not limited to this feature, and for example, the limit remaining distance maps 400 may be changed to characteristics (maps or the like) of the lane travel speed Vm with respect to the current host vehicle speed Vj, with the remaining distance Dr (limit remaining distance Dm) as a parameter.

B. Merging Assist Basic Control Operations

Basic control operations of the merging assist will be described with reference to FIG. 6.

The lane change assist control unit 222 confirms permission of the merging assist control at a timing within which the driver is capable of sufficiently responding to the merging point P5 (merging point 316), at a point P1 at which the host vehicle 12 is traveling along the approach path 304. Such a confirmation is notified at the point P1 by way of voice guidance after a synthesized sound "dong" is provided through the speaker 104, stating that "if the turn signal lever is operated, merging assist will be performed". The notification may also be shown on the display 103.

At point P2, when an operation in a clockwise direction of the turn signal lever 101 (including an operation in a clockwise direction by a one-touch turn signal) is confirmed, the lane change assist control unit 222 confirms through the contact sensor 108 whether or not the driver is gripping the steering wheel, and in the case that the driver is not gripping the steering wheel, then at point P3, a hands-on request is initiated through the speaker 104 so as to prompt the driver to grasp the steering wheel.

At point P4, when it is confirmed that the driver has grasped the steering wheel (is in a hands-on state), and it is deemed that the driver desires (the driver has acknowledged) the lane change assist control, a notification is issued through the speaker 104 to the driver by way of a synthesized sound and voice (hereinafter referred to simply as voice) "dong . . . the merging assist will be performed".

From point P4 at which the driver acknowledgment is confirmed, the lane change assist control is initiated by the lane change assist control unit 222, and a speed adjustment (acceleration to the system upper limit speed) is carried out along the target trajectory 301. However, the host vehicle speed Vj is limited to a set vehicle speed that is preset by the driver using the HMI 32.

Upon passing through the merging point 316 at point P5, lateral movement is terminated, and when a follow-on control (ACC) in the main line 320 is initiated at point P6, the direction indicator lamp (among the lamps 112, the turn signal lamp) of the host vehicle 12 on the side of the main line 320, and the direction indicator lamp within the meter panel 102 are turned off. In this manner, the lane change assist control (merging assist control) is successfully brought to an end.

C. Operations for a Case in Which the Merging Assist Control is Initiated, but the Assist is Impossible due to the Traffic Environment or the Like Operations for a case in which the merging assist control is initiated, but the assist is impossible due to the traffic environment or the like will be described with reference to FIG. 7.

At point P4, acknowledgment of the driver is confirmed and the merging assist control is started. However, the merging assist control becomes difficult to carry out due to the traffic environment such as traffic congestion due to the proximity of the plurality of other vehicles 350 or the like within the main line 320. Under such a condition, when the limit point Pm of the merging assist (the point at which the remaining distance Dr becomes the limit remaining distance Dm) is reached, in accordance with the determination made by the merging assist capability determination unit 220, the lane change assist control unit 222 cancels (abandons) the merging assist, and through the speaker 104, a notification (guidance) is issued by voice, stating "ding ding ding . . . the merging assist will be canceled".

In this case, if the free space 312 is detected, the lane change assist control unit 222 changes the target trajectory 301 to a straight target trajectory 330 for stopping the vehicle in the free space 312, and entrusts the control of the vehicle 12 to the vehicle stop control unit 228. Moreover, between point P7 and point P8, the notification "please perform driving operations" is issued by way of voice, together with an icon being shown on the display 103.

Since it is acceptable merely to decelerate and stop within the free space 312, in order to prevent obstruction of the flow of traffic within the merging lane 302 and prevent a rear-end vehicle collision, from the limit point Pm until the point P7 which is the vanishing point 310, the vehicle stop control unit 228 performs a speed control while undergoing cruise traveling (constant speed traveling) or during traveling while weakly decelerating, but does not perform the speed control during traveling while rapidly decelerating.

Furthermore, within the free space 312 from the point P7, the lamps 112, and in this case the hazard lamps (emergency flashing display) are illuminated, while additionally, a warning sound is sounded through the horn 114 and stopping of the vehicle is notified to the surrounding vicinity, and the vehicle decelerates slowly to point P8, and then, from point P8 to point P9 which is the vehicle stop position, the host vehicle 12 is urgently made to stop in front of the car stop 314 by a rapidly performed two-stage deceleration.

Moreover, in the case that the free space 312 is not available in front of the vanishing point 310 of the merging lane 302, as will be described later with reference to FIG. 8A, the vehicle is made to stop immediately by way of rapid deceleration in the vicinity of the vanishing point 310 of the merging lane 302.

As other cases in which the assist has been initiated but the assist cannot be continued due to the traffic environment or the like, and in which the host vehicle 12 is stopped within the free space 312 or at the vanishing point 310 of the merging lane 302, there are also cases in which the driver is confronted with a failure situation, as in the following cases.

For example, the driver monitoring unit 201 detects, by output signals of the contact sensor 108 from among the driver sensors 106, that the driver is in a hands-off state with respect to the steering wheel, and causes the vehicle to make an emergency stop even in the case that the limit point Pm has been reached. Further, the driver monitoring unit 201 detects, by image signals of the in-vehicle camera 110 from among the driver sensors 106, that the line of sight of the driver is not facing forward in the travel direction, and causes the vehicle to make an emergency stop even in the case that the limit point Pm has been reached.

D. Concept of the Merging Assist Limit Point

The concept of the merging assist limit point will be described with reference to FIGS. 8A and 8B.

In the case that the driver is in the hands-off state when reaching the point P4q in front of the limit point Pm, at a more forward location in the travel direction of the host vehicle 12 than the point P4 where merging is initiated, a margin interval (takeover interval) may be provided between this point P4q and the limit point Pm. Within such a margin interval, in the case that a hands-on request is made to the driver and the driver responds to the hands-on request, and more specifically, in the case that the driver grips the steering wheel, as shown in FIG. 8B, the lane change assist control unit 222 entrusts driving to the driver, and the driver is capable of accelerating from the limit point Pm up to the speed of the main line, and merging with the main line 322.

On the other hand, as shown in FIG. 8A, in the case that the driver has not gripped the steering wheel by the limit point Pm, the vehicle stop control unit 228 executes an automatic deceleration and stop control in the vicinity (point P7) of the vanishing point 310 of the merging lane 302.

The limit point Pm can be considered as a limit point at which the lane change assist control unit 222 abandons allowing the lane change manually by the driver.

E. Operations for a Case in Which There is a Driver Acknowledgment Operation but the Vehicle Stops Without Responding to the Hands-On Request Operations for a case in which there is a driver acknowledgment operation but the vehicle stops without responding to the hands-on request will be described with reference to FIG. 9.

At point P4, although the driver has operated the turn signal lever 101 and performed an acknowledgment operation with respect to execution of the lane change assist control by the lane change assist control unit 222 of the action planning unit 206, in the case that the hands-on request is not responded to by the limit point Pm for the merging assist, the lane change assist control unit 222 entrusts the control to the vehicle stop control unit 228 without initiating lateral movement.

In this case, similar to the case described with reference to FIG. 7, the vehicle stop control unit 228 changes the target trajectory 301 to the target trajectory 330 to stop the vehicle within the free space 312, and controls the host vehicle speed Vj in a manner so that the vehicle travels by cruise traveling (constant speed traveling) or weak deceleration traveling from the limit point Pm to the vanishing point 310 (point P7).

Furthermore, within the free space 312 from the point P7, the vehicle stop control unit 228 illuminates the hazard lamps and travels while a warning sound is sounded, and slowly decelerates the vehicle to point P8, and then, from point P8 to point P9 which is the vehicle stop position, the host vehicle 12 is urgently made to stop in front of the car stop 314 by a rapidly performed two-stage deceleration.

F. Operations for a Case in Which the Vehicle is Stopped Outside of the Road (in the Free Space) or Within the Road (at the Vanishing Point of the Merging Path)

Operations for a case in which the vehicle is stopped outside of the road (in the free space) or within the road (at the vanishing point of the merging path) will be described with reference to the flowcharts of FIGS. 10 and 11.

In step S21, the action planning unit 206 determines whether or not the host vehicle 12 has started traveling in the merging lane 302. In the case it is determined that the vehicle has initiated traveling (step S21: YES), voice guidance is carried out, stating "dong . . . when the turn signal lever is operated, the merging assist will be performed". In step S22, the lane change assist control unit 222 determines whether or not the turn signal lever 101 has been operated.

If it is determined that such an operation has been performed (step S22: YES), then in step S23, the lane change assist control unit 222 executes (if not being executed, initiates execution, and if execution has been started, continues execution) of the lane change assist control. Moreover, in the case there is no merging lane 302 (step S21: NO), or if the turn signal lever 101 has not been operated (step S22: NO), the lane change assist control is not initiated.

In step S24, the lane change assist control unit 222 determines whether or not the lane change assist control (merging assist control) has been executed and completed before passing through the limit point Pm, or stated otherwise, determines whether or not the merging assist control into the main line 320 has been performed before the host vehicle 12 passes through the limit point Pm.

In the case it is determined that the merging assist control is being performed and merging into the main line 320 is taking place (step S24: YES), the lane change assist control is terminated.

On the other hand, in the case it is determined in step S24 that the merging assist control is being continued without being terminated (step S24: NO), then in step S25, the vehicle stop control unit 228 searches for the end point (the vanishing point 310 and the vanishing point of the free space 312) through the external object detection unit 210 (see FIG. 2).

Figure 11:
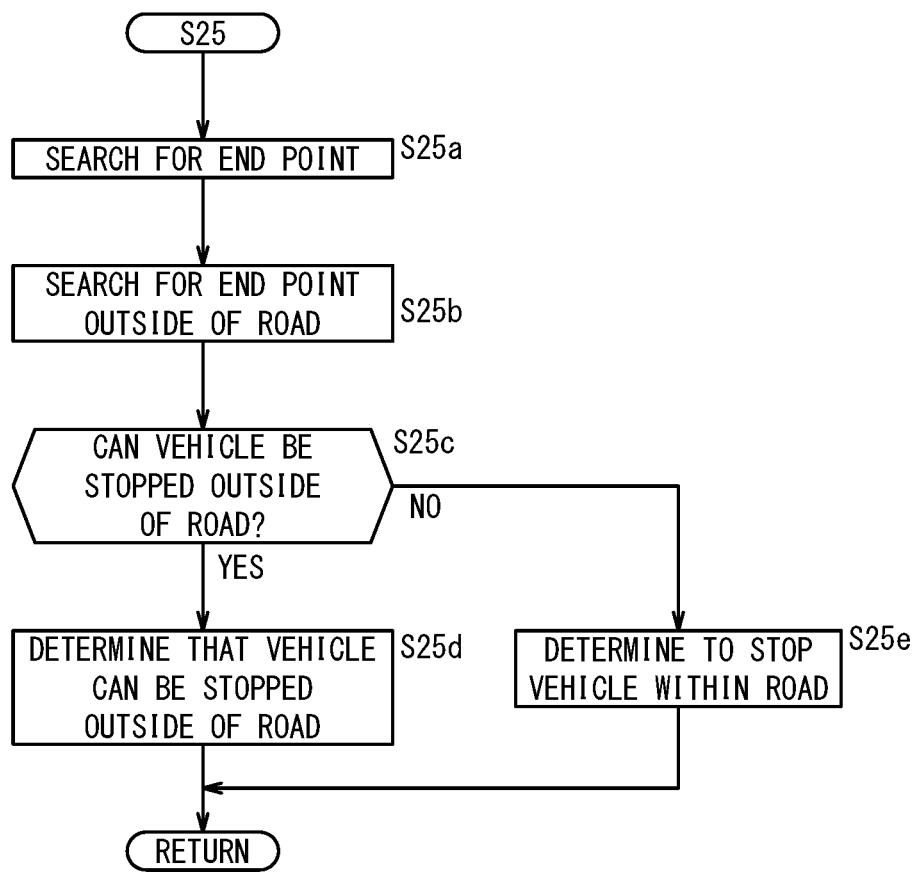
FIG. 11 is a flowchart illustrating an end point search subroutine.

FIG. 11 is a flowchart illustrating an end point search subroutine.

In step S25a, a search (end point search) for the vanishing point 310 of the merging lane 302 is conducted to thereby calculate the remaining distance Dr to the vanishing point 310, and in step S25b, a search (end point outside of road search) for the free space 312 in front of the vanishing point 310 of the merging lane 302 is conducted, and the remaining distance Dr to the vanishing point such as the car stop 314 or the like is calculated.

In step S25c, a determination is made as to whether or not the vehicle can be stopped outside of the road, based on the presence or absence of the free space 312.

In the case that the free space 312 is detected (step S25c: YES), it is determined that the vehicle can be stopped outside of the road, and in step S25d, preparations are made for the deceleration and stop control within the free space 312, whereas in the case that the free space 312 is not detected (step S25c: NO), it is determined that the vehicle cannot be stopped outside of the road, and in step S25e, preparations are made for the deceleration and stop control in the vicinity of the vanishing point 310.

Continuing to step S26, a determination is made as to whether or not the host vehicle 12 has traveled to the limit point Pm at which the remaining distance Dr becomes the limit remaining distance Dm.

In the case that the remaining distance Dr is large and the vehicle is not traveling to the limit point Pm (step S26: NO), the process returns to the assist control process of step S23, the end point searching step S25 is repeated, and the accuracy of the remaining distance Dr is increased.

In step S26, in the case that the vehicle has traveled to the limit point Pm without completion of the merging assist control (step S26: YES), it is determined that the remaining distance Dr has become smaller than the limit remaining distance Dm, and in step S27, the deceleration and stop control is executed by the vehicle stop control unit 228.

G. Operations for a Case in which a Hands-Off State Occurs After Acknowledgment of the Driver, and a Hands-On State Occurs Again Before the Limit Point of the Merging Assist Operations for a case in which a hands-off state occurs after acknowledgment of the driver, and a hands-on state occurs again before the limit point of the merging assist will be described with reference to FIG. 12.

At point P2 of the approach path 304, after the merging assist control is initiated by the turn signal lever 101 being operated while the driver is in the hands-on state, for example, in the case that the hands-off state occurs at point P4r of the rampway 306, the lane change assist control unit 222 immediately initiates and continues the hands-on request (the statement "please grip the steering wheel" is made by way of voice guidance and displayed on the meter panel 102).

In this case, if the hands-on state occurs again at point P4s before reaching the limit point Pm, the hands-on request is terminated, and the lane change assist control unit 222 initiates lateral movement for the purpose of the lane change assist control, and implements the lane change assist control along the target trajectory 301, the host vehicle 12 merges into the main line 320, and the lane change assist control is ended at point P6b.

H. Operations for a Case in which a Hands-Off State Occurs After Acknowledgment of the Driver, and the Hands-Off State is Continued Until Reaching the Limit Point of the Merging Assist Operations for a case in which a hands-off state occurs after acknowledgment of the driver, and the hands-off state is continued until reaching the limit point of the merging assist will be described with reference to FIG. 13.

At point P2 of the approach path 304, after the merging assist control is initiated by the turn signal lever 101 being operated while the driver is in the hands-on state, for example, in the case that the hands-off state occurs at point P4r of the rampway 306, the lane change assist control unit 222 immediately initiates and continues the hands-on request ("please grip the steering wheel").

In this case, even if the hands-off state is occurring at point P4r, the lane change assist control unit 222 continues to adjust the vehicle speed.

However, in the case that the hands-off state of the driver is continued until the limit point Pm of the merging assist, the voice guidance "ding ding ding . . . the merging assist will be canceled" is given, while simultaneously, the lane change assist control unit 222 changes the target trajectory 301 to the straight target trajectory 330, and thereafter, even if the driver assumes the hands-on state, the lane change assist control unit 222 does not perform the merging assist.

Since the free space 312 is detected outside of the road, thereafter, the vehicle stop control described with reference to FIG. 7 is carried out.

I. Operations for a Case in Which, After Acknowledgment of the Driver, the Host Vehicle Starts to Move Laterally and Straddles the Lanes, and Thereafter a Hands-Off State Occurs Operations for a case in which, after acknowledgment of the driver, the host vehicle starts to move laterally and straddles the lanes, and thereafter a hands-off state occurs will be described with reference to FIG. 14.

In the case that, at point P2 of the approach path 304, the merging assist control is initiated by the turn signal lever 101 being operated while the driver is in the hands-on state, and a hands-off operation is performed simultaneously with the host vehicle 12 having straddled the lanes (the host vehicle 12 has entered the main line 320 from the acceleration lane 308) at point P5 (merging point 316), the lane change assist control unit 222 continues the lane change assist control along the target trajectory 301 without suspending the lane change assist control, and at point P6, the lane change assist control is terminated, and the follow-on control is initiated.

Moreover, from the hands-off point P5 to the end point P6, the hands-on request is continued.

J. Operations for a Case in Which, After Acknowledgment of the Driver, the System Initiates Lateral Movement, and Before Straddling the Lanes, a Hands-Off State Occurs Operations for a case in which, after acknowledgment of the driver, the system initiates lateral movement, and before straddling the lanes, a hand-off state occurs will be described with reference to FIG. 15.

At point P2 of the approach path 304, the merging assist control is initiated by the turn signal lever 101 being operated while the driver is in the hands-on state, and when the driver has assumed the hands-off state at the point P4s before passing the limit point Pm of the merging assist, and before straddling the lane 308 and the main line 320, the lane change assist control unit 222 returns the host vehicle 12 to the merging lane 302 while the blinker (direction indicator lamp) remains flashing.

In the case that the hands-on state occurs again before the limit point Pm of the merging assist, the merging assist is resumed. However, in the case that the hands-off state is continued, the vehicle stop control unit 228 executes the vehicle stop control.

[Invention that can be Grasped from the Embodiment]

In this instance, the invention that can be grasped from the above-described embodiment will be described below. Although for convenience of understanding, the reference numerals used in the embodiment are written in parentheses together with the constituent elements, the constituent elements are not limited to the features to which such reference numerals pertain.

The vehicle control device (10) according to the present invention comprises the lane change assist control unit (222) which assists the lane change of the host vehicle (12) into the adjacent second lane (320) when the first lane (302) in which the host vehicle (12) is currently traveling disappears, the remaining distance calculation unit (224) that calculates the remaining distance (Dr) until the vanishing point (310) of the first lane (302), and the second lane travel speed setting unit (226) which sets the lane travel speed (Vm) of the second lane (320), wherein the lane change assist control unit (222) refers to the lane travel speed (Vm) of the second lane (320), the host vehicle speed (Vj), and the characteristics (400) including the remaining distance Dr (limit remaining distance Dm), and determines whether to continue or cancel the lane change assist control.

In accordance with such a configuration, by referring to the limit characteristics (400) including the lane travel speed (Vm) of the second lane (320) which is the adjacent lane, the current host vehicle speed (Vj), and the remaining distance (Dr) (limit remaining distance Dm), and determining whether to continue or cancel the lane change assist control, the lane change assist control unit (222) is capable of easily performing the lane change assist control insofar as possible while the burden on the user who performs manual driving is reduced.

Further, in the vehicle control device (10), the lane change assist control unit (222) may determine to cancel the lane change assist control with a longer remaining distance (Dr) in the first lane (302) as the lane travel speed (Vm) of the second lane (320) becomes higher.

In accordance with this feature, the determination is made to cancel the lane change assist control with a longer remaining distance (Dr) in the first lane (302) as the lane travel speed (Vm) of the second lane (320) which is the adjacent lane becomes higher, and therefore, an accurate determination as to whether to continue or cancel can be made corresponding to the lane travel speed (Vm) of the second lane (320).

Further still, in the vehicle control device (10), in the case that the other vehicles (350) traveling in the second lane (320) are not detected, the second lane travel speed setting unit (226) may set the lane travel speed (Vm) of the second lane (320) to the legal speed limit, whereas in the case that the other vehicles (350) are detected, the second lane travel speed setting unit (226) may set the lane travel speed (Vm) of the second lane (320) in consideration of the speed of the other vehicles (350).

In accordance with this feature, an accurate determination as to whether to continue or cancel can be made in accordance with the flow of traffic (legal speed limit or actual speed) of the adjacent second lane (320).

Further still, in the vehicle control device (10), in the case that the remaining distance (Dr) is less than the limit remaining distance (Dm) in the characteristic (400) at which the lane change into the second lane (320) is impossible, the lane change assist control unit (222) may cancel the lane change assist control, and may perform the deceleration control.

In accordance with this feature, since the deceleration control is performed in the case that the remaining distance (Dr) is less than the limit remaining distance (Dm) at which the lane change is impossible even after accelerating, adaptability is excellent.

Further still, in the vehicle control device (10), when the lane change assist control is canceled and the deceleration control is performed, the host vehicle (12) may be made to stop in accordance with a two-stage deceleration control in which a strong deceleration control is performed after a weak deceleration control.

Consequently, for example, during the weak deceleration control, the vehicle occupant can subsequently be made to recognize that a strong deceleration control has occurred, and therefore, a user friendly deceleration control can be performed.

Further still, in the vehicle control device (10), the remaining distance calculation unit (224) may calculate the remaining distance (Dr) on the basis of the captured image captured by the image capturing device (60), and may calculate the remaining distance (Dr) using the map (70) in the case that the captured image cannot be acquired.

In accordance with this feature, for example, in the case that a stopped obstacle (352) that is not on the map exists before the vanishing point (310) of the first lane (302), by calculating (updating) the remaining distance (Dr) in consideration of the size of the stopped obstacle (352) based on the captured images captured by the image capturing device (60), the actual (current) remaining distance (Dr) can be accurately calculated.

Further still, in the vehicle control device (10), the lane change assist control unit (222) may initiate the speed control for the lane change on the condition that a specified operating element (101) is operated.

In accordance with such a configuration, since it can be determined whether or not the lane change assist control is possible, a user-friendly lane change assist control can be performed.

Further still, in the vehicle control device (10), the above-described characteristic may be a characteristic (400) of the remaining distance (Dr) with respect to the host vehicle speed (Vj), with the lane travel speed (Vm) of the second lane (320) as a parameter.

In accordance with such a configuration, by determining to continue or cancel the lane change while using, as a parameter, the lane travel speed (Vm) of the second lane (320) which is the adjacent lane, the lane change assist control unit (222) is capable of performing the lane change assist control insofar as possible while the burden on the user who performs manual driving is reduced.

Further still, in the vehicle control device (10), the above-described remaining distance (Dr) in the characteristic is set to a necessary and shortest distance (Dm) in consideration of a transition time period within which, until reaching the vanishing point (310) of the first lane (302), the lane change assist control can be performed by the host vehicle (12) initiating lateral movement to the side of the second lane (320) while maintaining the system upper limit acceleration or an acceleration in the vicinity thereof, and accelerating the host vehicle speed (Vj) to the set travel speed (Vm) of the second lane (320) until reaching the merging point (316).

The present invention is not limited to the above-described embodiments, but it goes without saying that various alternative configurations could be adopted therein based on the content disclosed in the present specification.

What is claimed is:

1. A vehicle control device, comprising one or more processors that execute computer-executable instructions stored in memory, wherein the one or more processors execute the computer-executable instructions to cause the vehicle control device to:
    assist a lane change of a host vehicle from a first lane into a second lane that is adjacent to the first lane when the first lane in which the host vehicle is currently traveling will disappear;
    calculate a remaining distance until a vanishing point of the first lane; and
    set a lane travel speed for the host vehicle relative to the second lane,
    refer to the lane travel speed of the second lane, a host vehicle speed, and a characteristic including the remaining distance, and determine whether to continue or cancel the lane change assist control,
    wherein the characteristic is a characteristic of the remaining distance with respect to the host vehicle speed of the second lane as a parameter, and
    wherein the remaining distance in the characteristic is set to a necessary and shortest distance in consideration of a transition time period within which, until reaching the vanishing point of the first lane, the one or more processors are configured to control the lane change assist be performed by the host vehicle initiating lateral movement to a side of the second lane while maintaining a system upper limit acceleration or an acceleration in a vicinity thereof, and accelerating the host vehicle speed to the set travel speed of the second lane until reaching a merging point.

2. The vehicle control device according to claim 1, wherein the one or more processors cause the vehicle control device to determine to cancel the lane change assist control with a longer remaining distance in the first lane as the lane travel speed of the second lane becomes higher.

3. The vehicle control device according to claim 1, wherein, in a case that another vehicle traveling in the second lane is not detected, the one or more processors cause the vehicle control device to set the lane travel speed for the host vehicle relative to the second lane to a legal speed limit, whereas in a case that the other vehicle is detected, the one or more processors cause the vehicle control device to set the lane travel speed for the host vehicle relative to the second lane in consideration of a speed of the other vehicle.

4. The vehicle control device according to claim 1, wherein, in a case that the remaining distance is less than a limit remaining distance in the characteristic at which the lane change into the second lane is impossible, the one or more processors cause the vehicle control device to cancel the lane change assist control, and perform a deceleration control.

5. The vehicle control device according to claim 4, wherein, when the lane change assist control is canceled and the deceleration control is performed, the host vehicle is made to stop in accordance with a two-stage deceleration control in which a strong deceleration control is performed after a weak deceleration control.

6. The vehicle control device according to claim 1, wherein the one or more processors cause the vehicle control device to calculate the remaining distance on a basis of a captured image captured by an image capturing device, and calculate the remaining distance using a map in a case that the captured image is not acquirable.

7. The vehicle control device according to claim 1, wherein the one or more processors cause the vehicle control device to initiate a speed control for the lane change on a condition that a specified operating element is operated.

* * * * *